(12) United States Patent
Sheppard et al.

(10) Patent No.: US 12,554,696 B2
(45) Date of Patent: *Feb. 17, 2026

(54) METHODS AND APPARATUS TO ESTIMATE CARDINALITY OF USERS REPRESENTED ACROSS MULTIPLE BLOOM FILTER ARRAYS

(71) Applicant: The Nielsen Company (US), LLC, New York, NY (US)

(72) Inventors: Michael Sheppard, Holland, MI (US); Jonathan Sullivan, Hurricane, UT (US); DongBo Cui, New York, NY (US); Jake Ryan Dailey, San Francisco, CA (US); Christie Nicole Summers, Baltimore, MD (US); Diane Morovati Lopez, West Hills, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,748

(22) Filed: Jul. 2, 2024

(65) Prior Publication Data

US 2025/0005008 A1    Jan. 2, 2025

Related U.S. Application Data

(63) Continuation of application No. 18/364,535, filed on Aug. 3, 2023, now Pat. No. 12,038,898, which is a
(Continued)

(51) Int. Cl.
*G06F 16/00* (2019.01)
*G06F 15/80* (2006.01)
(Continued)

(52) U.S. Cl.
CPC .......... *G06F 16/2255* (2019.01); *G06F 15/80* (2013.01); *G06F 16/2246* (2019.01); *G06F 16/2456* (2019.01); *G06F 2015/763* (2013.01)

(58) Field of Classification Search
None
See application file for complete search history.

(56) References Cited

U.S. PATENT DOCUMENTS

| | | | |
|---|---|---|---|
| 11,216,588 B1* | 1/2022 | An | G06F 21/6227 |
| 2019/0272388 A1* | 9/2019 | Tsou | G06F 7/582 |
| 2021/0117428 A1* | 4/2021 | Dalgliesh | G06F 16/24558 |

* cited by examiner

Primary Examiner — Anhtai V Tran

(57) ABSTRACT

Methods and apparatus to estimate cardinality of users represented across multiple bloom filter arrays are disclosed. Examples includes processor circuitry to execute and/or instantiate instructions to generate a first composite Bloom filter array based on first and second Bloom filter arrays. The processor circuitry is to generate a final composite Bloom filter array based on the first composite Bloom filter array and a third Bloom filter array. Different ones of the first, second, and third Bloom filter arrays representative of different sets of users who accessed media. The first, second, and third Bloom filter arrays including differential privacy noise. The processor circuitry to estimate a cardinality of a union of the first, second, and third Bloom filter arrays based on the final composite Bloom filter array.

17 Claims, 14 Drawing Sheets

Related U.S. Application Data continuation of application No. 17/362,419, filed on Jun. 29, 2021, now Pat. No. 11,741,068.

(60) Provisional application No. 63/046,342, filed on Jun. 30, 2020.

(51) Int. Cl.
*G06F 16/22* (2019.01)
*G06F 16/2455* (2019.01)
*G06F 15/76* (2006.01)

METHODS AND APPARATUS TO ESTIMATE CARDINALITY OF USERS REPRESENTED ACROSS MULTIPLE BLOOM FILTER ARRAYS

CROSS-REFERENCE TO RELATED APPLICATIONS

This disclosure is a continuation of U.S. patent application Ser. No. 18/364,535, filed Aug. 3, 2023, now issued as U.S. Pat. No. 12,038,898, which is a continuation of U.S. patent application Ser. No. 17/362,419, filed Jun. 29, 2021, now issued as U.S. Pat. No. 11,741,068, which claims priority to U.S. Provisional Patent Application No. 63/046,342, filed on Jun. 30, 2020, each of which is hereby incorporated herein by reference in its entirety.

FIELD OF THE DISCLOSURE

This disclosure relates generally to monitoring media exposure, and, more particularly, to methods and apparatus to estimate cardinality of users represented across multiple bloom filter arrays.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the AME can determine exposure metrics (e.g., audience size) for different media based on the collected media measurement data.

As people are accessing more and more media through digital means (e.g., via the Internet), it is possible for online publishers and/or database proprietors providing such media to track all instances of exposure to media (e.g., on a census wide level) rather than being limited to exposure metrics based on audience members enrolled as panel members of an AME. However, database proprietors are typically only able to track media exposure pertaining to online activity associated with the platforms operated by the database proprietors. Where media is delivered via multiple different platforms of multiple different database proprietors, no single database proprietor will be able to provide exposure metrics across the entire population to which the media was made accessible. Furthermore, such database proprietors have an interest in preserving the privacy of their users such that there are limitations on the nature of the exposure metrics such database proprietors are willing to share with one another and/or an interested third party such as an AME.

Figure 1:
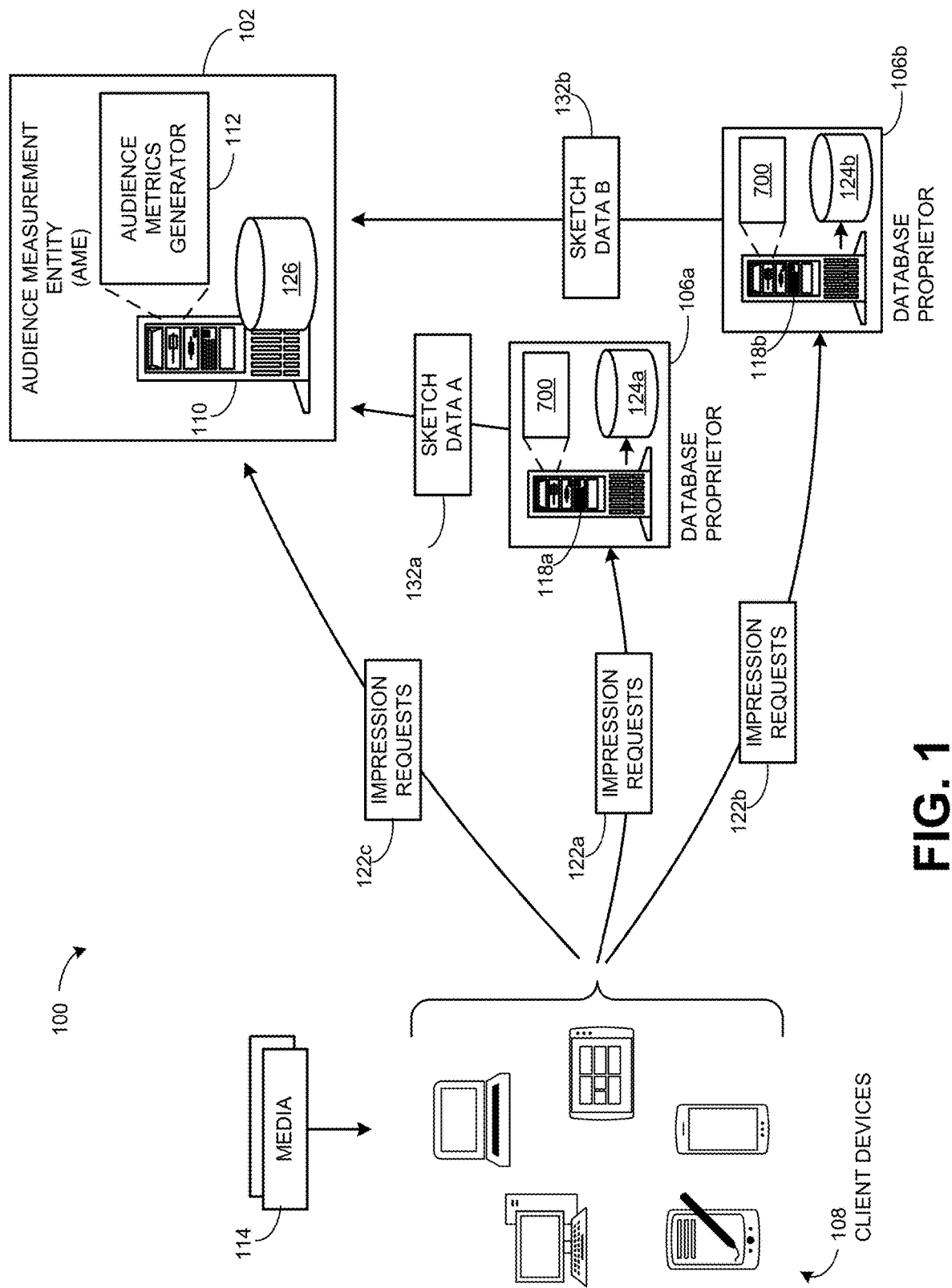
FIG. 1 is an example environment to implement a technique for logging impressions of accesses to server-based media.

The figures are not necessarily to scale. Instead, the thickness of the layers or regions may be enlarged in the drawings. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. As part of this registration, the subscribers may provide personally identifiable information (PII) including, for example, their name, their home address, their email address, etc. that is stored in a database operated and/or maintained by the database proprietor. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although AMEs (e.g., third parties) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reaches a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience (also known as audience size) is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. Not only does sketch data assist in protecting the privacy of users represented by the data, sketch data also serves as a memory saving construct to represent the contents of relatively large databases using relatively small amounts of date. Further, not only does the relatively small size of sketch date offer advantages for memory capacity but it also reduces demands on processor capacity to analyze and/or process such data.

Sketch data may include a cardinality defining the number of individuals (e.g., users or subscribers) represented by the data while maintaining the identity of such individuals private. The cardinality of sketch data associated with media exposure is a useful piece of information for an AME because it provides an indication of the number of audience members exposed to particular media via a platform maintained by the database proprietor providing the sketch data. However, in some instances, sketch data may be provided by database proprietors without providing an indication of the cardinality of the data. Even when the cardinality for sketch data is provided, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted (or possibly more than twice if there are more than two datasets being aggregated) resulting in the incorrect inflation of the unique audience size. Furthermore, identifying overlap between two different sets of sketch data (e.g., to deduplicate the users represented in the data) is non-trivial because, as stated above, the sketch data is generated to preserve the identity and privacy of the individuals represented thereby. Examples disclosed herein overcome the above challenges by enabling the estimation of a total cardinality of users represented in sketch data associated with two or more different datasets so that an AME may be able to deduplicate individuals represented in more than one of the datasets, thereby enabling the accurate estimate of the unique audience for a particular media item. Furthermore, the cardinality estimation in examples disclosed herein may be made with or without database proprietors providing the dataset-specific cardinalities associated with the different data sketches being combined.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers (e.g., database proprietors) to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between multiple different datasets while preserving privacy. The datasets themselves need not be audiences or email addresses. They could be, for example, bank accounts, lists of purchased items, store visits, traffic patterns, etc. The datasets could be represented as lists of numbers or any other information represented as unique entries in a database.

FIG. 1 shows an example environment 100 that includes an example audience measurement entity (AME) 102, a first example database proprietor 106a, a second example database proprietor 106b, and example client devices 108. The example AME 102 includes an example AME computer 110 that implements an example audience metrics generator 112 to determine audience sizes based on media impressions logged by the database proprietors 106a-b. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). The content providers may be the same as or different entities than the database proprietors 106a-b. In some examples, the media 114 is served by media servers of the same internet domains as the database proprietors 106a-b. For example, the database proprietors 106a-b include corresponding database proprietor servers 118a-b that can serve media 114 to their corresponding subscribers via the client devices 108. Examples disclosed herein can be used to generate audience metrics data that measures audience sizes of media served by different ones of the database proprietors 106a-b. For example, the database proprietors 106a-b may use such audience metrics data to promote their online media serving services (e.g., ad server services, media server services, etc.) to prospective clients. By showing audience metrics data indicative of audience sizes drawn by corresponding ones of the database proprietors 106a-b, the database proprietors 106a-b can sell their media serving services to customers interested in delivering online media to users.

In some examples, the media 114 is presented via the client devices 108. When the media 114 is accessed by the client devices 108, the client devices 108 send impression requests 122a-b to the database proprietor servers 118a-b to inform the database proprietor servers 118a-b of the media accesses. In this manner, the database proprietor servers 118*a-b* can log media impressions in impression records of corresponding database proprietor audience metrics databases 124*a-b*. In some examples, when a database proprietor server 118*a-b* serves the media 114, the impression request 122*a-b* includes a first-party cookie set by that database proprietor server 118*a-b* so that the database proprietor server 118*a-b* can log an impression for the media 114 without using a third-party cookie. In some examples, the client devices 108 also send impression requests 122*c* to the AME 102 so that the AME 102 can log census impressions in an AME audience metrics database 126. In the illustrated example of FIG. 1, the database proprietors 106*a-b* log demographic impressions corresponding to accesses by the client devices 108 to the media 114. Demographic impressions are impressions logged in association with demographic information collected by the database proprietors 106*a-b* from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the first database proprietor 106*a* and some media impressions accessed via a platform maintained by the second database proprietor 106*b*. In some examples, the AME computer 110 does not collect impressions, and examples disclosed herein are based on audience data from impressions collected by the database proprietors 106*a-b*. For instance, the AME computer 110 may not collect impressions if the database proprietors 106*a-b* do not allow or support third-party cookies on their platforms.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122*a-c* (e.g., also referred to as tag requests) to one or more specified servers of the AME 102, the first database proprietor 106*a*, and/or the second database proprietor 106*b*. As used herein, impression requests 122*a-c* are used by the client devices 108 to report occurrences of media impressions caused by the client devices accessing the media 114. In the illustrated example, the impression requests 122*a-b* include user-identifying information that the database proprietors 106*a-b* can use to identify the subscriber that accessed the media 114. For example, when a subscriber of the first database proprietor 106*a* logs into a server of the first database proprietor 106*a* via a client device 108, the first database proprietor 106*a* sets a database proprietor cookie on the client device 108 and maps that cookie to the subscriber's identity/account information at the database proprietor server 118*a*. In examples disclosed herein, subscriber identity and/or subscriber account information includes personally identifiable information (PII) such as full name, street address, residence city and state, telephone number, email address, age, date of birth, social security number, demographic information, and/or any other personal information provided by subscribers in exchange for services from the database proprietors 106*a-b*. By having such PII data mapped to database proprietor cookies, the first database proprietor 106*a* can subsequently identify the subscriber based on the database proprietor cookie to determine when that user accessed different media 114 and to log an impression in association with demographics and/or other PII data of that user. In the illustrated example of FIG. 1, the impression requests 122*a-b* include database proprietor cookies of the client devices 108 to inform the database proprietors 106*a-b* of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The impression requests 122*a-c* may be implemented using HTTP requests. However, whereas HTTP requests are network communications that traditionally identify web pages or other resources to be downloaded, the impression requests 122*a-c* of the illustrated example are network communications that include audience measurement information (e.g., ad campaign identification, content identifier, and/or user identification information) as their payloads. The server (e.g., the AME computer 110 and/or the database proprietor servers 118*a-b*) to which the impression requests 122*a-c* are directed is programmed to log occurrences of impressions reported by the impression requests 122*a-c*. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122*a-c* to report the access to the media 114. In such examples, the data collector can obtain user identifiers and/or device identifiers stored in the client devices 108 and send them in the impression requests 122*a-c* to enable the database proprietors 106*a-b* and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118*a-b* may additionally or alternatively use server logs to log impressions based on requests for media 114 from the client devices 108. For example, when a user of a client device 108 provides a URL or selects an item of media for viewing, the client device 108 sends an HTTP request (e.g., the impression request 122*a-b*) to a database proprietor server 118, *a-b* that includes the first-party cookie and an identifier of the requested media. In response, the database proprietor server 118*a-b* serves the requested media to the client device 108 and logs an impression of the media as attributable to the client device 108.

Typically, the database(s) 124*a-b* maintained by the database proprietors 106*a-b* are implemented in a closed platform or walled garden so that untrusted third parties do not have access to the information stored in the database. Among other reasons, database systems implemented in this manner serve to maintain the privacy of the users registered with the database proprietors 106*a-b*. Maintaining the privacy of individuals represented within the databases of the database proprietors 106*a-b* is in some tension with the interests of third-party entities (e.g., media providers that may want to target particular individuals (and/or particular demographic segments of a population) with media (e.g., advertisements)), and/or the AME 102 that may want to generate audience metrics (e.g., audience size) based on tracked exposures to the media 114).

In the illustrated example, the database proprietors 106*a-b* collaborate with the AME 102 so that the AME 102 can operate as an independent party that measures and/or verifies audience measurement information pertaining to the media 114 accessed by the subscribers of the database proprietors 106*a-b*. However, the database proprietors 106*a-b* desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106*a-b* process their collected impression data to generate corresponding sketch data 132*a-b*. In some examples, the sketch data 132*a-b* is generated by a database proprietor apparatus 700 implemented by the corresponding data base proprietor servers 118*a-b*. Further detail regarding the database proprietor apparatus 700 is provided below in connection with FIG. 7.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, summary statistics or sketch data provide an indication of certain characteristics (e.g., number of impressions of a media item and/or audience reach of the media item) of data in a database without disclosing any personally identifiable information of individual users that may have contributed to the summary statistics.

One type of data structure that is useful to provide summary statistics (e.g., sketch data) in the context of tracking exposure to media is the Bloom filter array. A typical Bloom filter array is a vector or array of bits that are initialized to 0 and then populated by flipping individual ones of the bits from 0 to 1 based on the allocation or assignment of users (or other data entries) in a database (e.g., the databases 124*a-b* of the database proprietors 106*a-b* of FIG. 1) to respective ones of the bits in the Bloom filter array. The users (or other data entries) in a database that are represented in the Bloom filter array are identified as corresponding to summary statistics of interest (e.g., users that were exposed to a particular media item, users that visited a particular website, etc.). That is, while it would be possible to generate a vector for sketch data of all subscribers of either one of the database proprietors 106*a-b*, in many instances, the subscribers included in particular sketch data 132*a-b* may be the subset of all subscribers that corresponds to audience members that accessed and/or were exposed to a particular media item 114 of interest and/or the subset of all subscribers identified based on any other suitable filter defined by one or more criteria.

Figure 2:
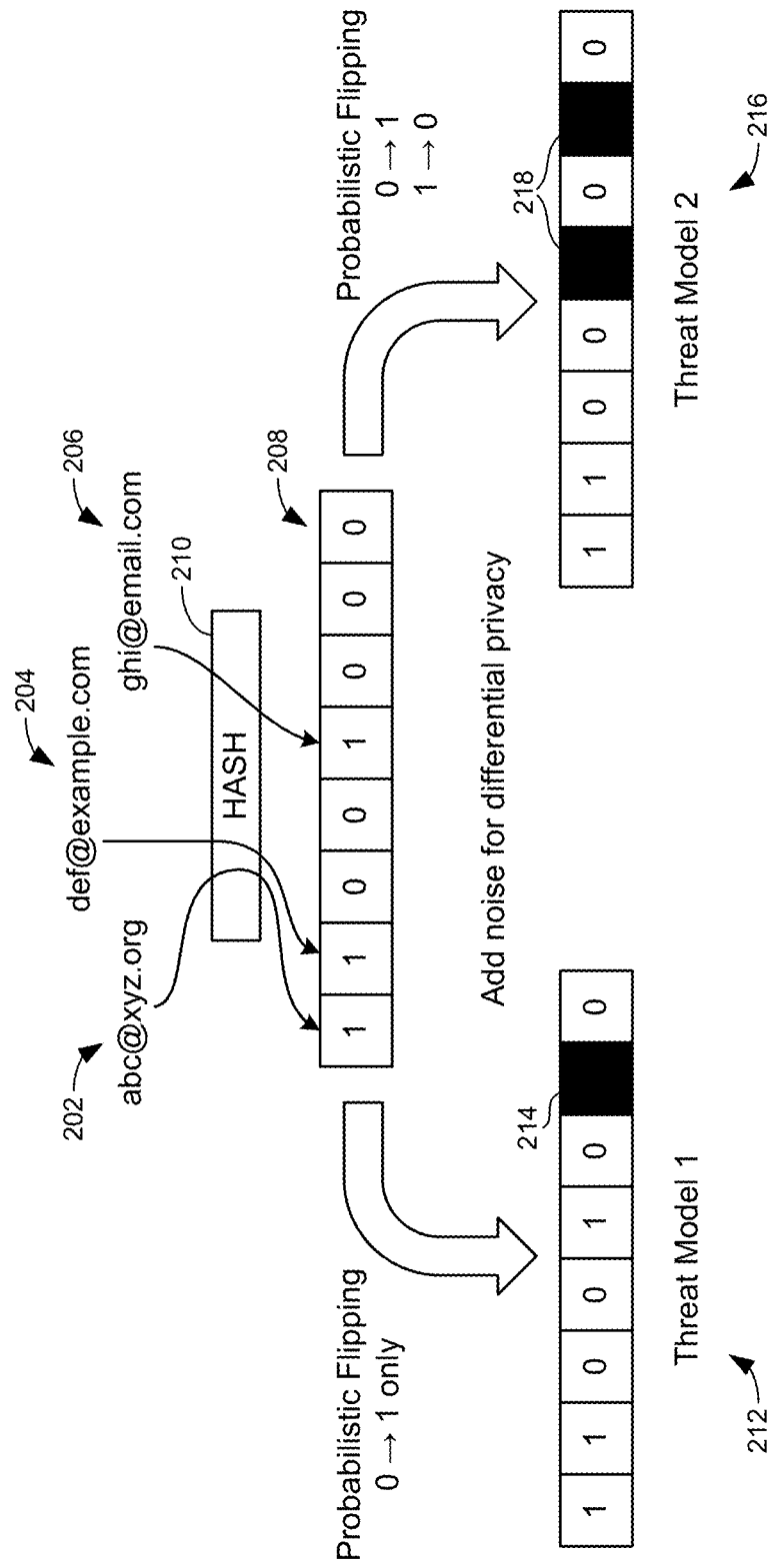
FIG. 2 illustrates the creation of an example Bloom filter array with noise added according to two different threat models.

The process of generating a Bloom filter array representative of three distinct users is demonstrated in connection with FIG. 2. As shown in the illustrated example of FIG. 2, the distinct users are represented by three distinct email addresses 202, 204, 206 that are assigned or allocated to individual bits or elements of an example Bloom filter array 208 having a length of 8 bits or elements. In this example, the Bloom filter array 208 is initialized to have all 0 values that are then flipped to a value of 1 based on the allocation of the users in the underlying data to be represented by the Bloom filter array 208. More particularly, in some examples, the particular bit or element in the Bloom filter array 208 to which a particular user is mapped is based on the output of a hash function 210 of a personal identifier of the user (e.g., the email addresses 202, 204, 206 of FIG. 2). While the email addresses 202, 204, 206 are represented in the figure, any type of PII data could additionally or alternatively be used.

Although one hash function 210 is represented in the illustrated example, in some examples, more than one hash function (e.g., 2, 3, 4, etc.) may be applied to each email address 202, 204, 206 such that each user is allocated or assigned to multiple different elements in the Bloom filter array (e.g., each user is assigned to the same number of elements in the Bloom filter as the same number of hash functions used to assign the users). Whether one or more hash function(s) is/are used, each such hash function 210 is designed to map a particular input (e.g., a particular email address 202, 204, 206) to one and only one element in the Bloom filter array 208.

In some examples, for the sketch data 132*a-b* (e.g., the Bloom filter array 208 of FIG. 2) from the separate database proprietors 106*a-b* to be reliably aggregated and meaningfully analyzed, the particular hash function(s) 210 used by each database proprietors 106*a-b* need to be agreed upon in advance. Further, the length of the Bloom filter array 208 as generated by each database proprietors 106*a-b* needs to be the same. Based on these constraints, if a user is a registered subscriber of both database proprietors 106a-b and identified as an audience member of a particular media item 114, then both database proprietors 106a-b will include the user in their respective Bloom filter arrays (e.g., sketch data 132a-b) and the user will be allocated to the same elements in both Bloom filter arrays (e.g., based on the same output of the same hash function used by both database proprietors 106a-b). Inasmuch as hashing functions cannot be reversed, the PII data for the particular audience members is kept private, thereby preserving the anonymity of the underlying raw data represented by the sketch data 132a-b.

As represented in FIG. 2, the three email addresses 202, 204, 206 are respectively allocated to the first, second and fifth elements of the Bloom filter array 208 based on the output of the hash function 210 generated using the email addresses 202, 204, 206 as inputs. As such, the bit value of each of the first, second, and fifth elements in the Bloom filter array 208 are flipped from a 0 (prior to the allocation of the users to the array) to a 1. If a fourth user were allocated to any one of the first, second, or fifth elements in the Bloom filter array 208 (e.g., based on a fourth email address processed through the hash function 210 and mapped to the resulting element), there would be no change to the Bloom filter array 208 because the value of the corresponding element would already be 1. In other words, a value of 0 in a particular element in a Bloom filter array 208 remains a 0 so long as no data entry (e.g., no user) is mapped to that particular element. However, once at least one user is mapped to a particular element the value of the element is flipped to a 1 and remains a 1 regardless of any further assignments of different users to the same element.

As mentioned above, in some examples, each user may be allocated to multiple different elements in the Bloom filter array 208 based on multiple different hash functions. In such situations, it is possible that a single user is allocated to the same element multiple times (e.g., based on two separate hash functions). The mapping of the output of multiple different hash functions to the same element for a single user identifier (e.g., any one of the email addresses 202, 204, 206) is referred to as a hash collision. There is always some probability that a hash collision may occur when multiple hash functions are used. However, the probability of a hash collision may be reduced by increasing the length of the Bloom filter array 208 (e.g., increasing the number of elements in the array to which a user may be allocated). In many applications, the number of elements in a Bloom filter array may number in the hundreds or even in the thousands such that hash collisions are relatively rare.

Relatively long Bloom filter arrays also reduce the likelihood of the array becoming saturated. A Bloom filter array becomes saturated when an overly large proportion of the bits are flipped to a value of 1. As mentioned above, once a bit value is flipped to a 1 in a Bloom filter array, the value remains at a value of 1 thereafter. Thus, as the number of users to be represented in a Bloom filter array increases, there will be an ever increasing number of 1s until (theoretically) all 0s have become 1s. When a Bloom filter array is entirely filled with 1s (or has an overly large proportion of 1s) it is no longer possible to infer anything from the sketch data. Accordingly, Bloom filter arrays are designed with a sufficient length relative to an expected size of the database to be represented to reduce (e.g., avoid) saturation so that the resulting sketch data remains meaningful and valuable.

While longer Bloom filter arrays reduce the likelihood of hash collisions and reduce the likelihood of saturation occurring, longer Bloom filter arrays can increase memory requirements to store the arrays and reduce the computational efficiency with which the arrays may be analyzed. Furthermore, having Bloom filter arrays that are overly long presents concerns for user privacy. For instance, although the Bloom filter array 208 of FIG. 2 does not contain any personally identifiable information (PII) data (e.g., the email addresses 202, 204, 206), the flipping of bits from 0 to 1 is based on a hash of such PII data. As such, if a Bloom filter array is sparsely populated because of a relatively large number of elements to which each user may be allocated and/or a relatively small database represented in the Bloom filter array, it is possible that separate users will be mapped to separate elements in the Bloom filter array with no overlap. In such a situation, there may be a loss of privacy if a third-party entity has access to the Bloom filter array and has independent access to the email addresses 202, 204, 206 (or other PII data) used to allocate users to the array and knows the particular hash function(s) used to populate the Bloom filter array 208. In particular, the third party may be able to confirm whether or not a particular user was included in the sketch data represented by the Bloom filter array 208 by regenerating the hashes and mapping the outputs to the Bloom filter array 208 to see whether the corresponding elements have a bit value of 0 or 1. However, this privacy concern is somewhat mitigated for very large databases and/or Bloom filter arrays with short lengths because multiple user are more likely to map to the same element in the Bloom filter array 208. That is, a bit value of 1 in a particular element of the Bloom filter array 208 may correspond to multiple users in a database the Bloom filter array 208 is created to represent such that a third-party entity may only confirm whether it is possible that a particular user is included in the dataset underlying the Bloom filter array 208. Therefore, the length of a Bloom filter array is often defined based on a tradeoff between increasing user privacy (by reducing the vector length) and reducing saturation for more reliable statistics (by increasing the vector length). Notably, if a third-party entity determines that the output of a hash function for a particular user corresponds to an element in the Bloom filter array 208 that has a value of 0, the third-party entity can at least confidently confirm that the particular user is not included in the underlying dataset. Thus, while Bloom filter arrays can generate false positives when testing for dataset membership, false negatives are impossible (unless additional steps are taken to increase privacy by, for example, adding noise to the array as discussed further below).

Even though the contents of a database may be summarized by sketch data in the form of a Bloom filter array, the mere fact of including the data associated with a particular user in sketch data for a corresponding database still has the potential to expose the user to a loss of privacy based on differences in the summary statistics depending on whether or not the user information of the particular user is included. Often, summary statistics shared outside of a walled garden (closed platform) system are designed to be differentially private. Summary statistics are differentially private if a third party having access to the summary statistics cannot determine whether the user information of a particular individual was used in generating the summary statistics. Differential privacy is defined mathematically by the concept of $\varepsilon$-differential privacy, which also defines the parameters under which noise must be added to the summary statistics to ensure the resulting summary statistics are differentially private.

Thus, in some examples, to satisfy the requirements of differential privacy, noise is introduced into the Bloom filter array 208 before it is shared with other (e.g., untrusted) entities. More particularly, noise is added to the Bloom filter array 208 by flipping values of different ones of the bits in the array. The particular manner in which the bit values are flipped may depend upon the type of privacy threat model the database proprietors 106a-b seek to prevent. Two example approaches are represented in FIG. 2. A first threat model 212 corresponds to a scenario where an adversary desires to determine that a user with a known identifier (e.g., a known email address 202, 204, 206) was exposed to the media associated with the Bloom filter array 208. In some such examples, randomly selected bits (e.g., the shaded bit 214) in the Bloom filter array 208 having a value of 0 are flipped to 1 with some probability p, but all bits with a value of 1 remain with a value of 1. In some examples, the value for the probability p for each particular element or bin in the Bloom filter may be the same as for every other element. In other examples, the probability p for each element in the Bloom filter may be independently defined. The random flipping of 0s to 1s ensures that the presence of a single user identifier in the Bloom filter cannot be verified with certainty. A second threat model 216 corresponds to a scenario where an adversary desires to determine that a user with a known identifier (e.g., a known email address 202, 204, 206) either was exposed to the media associated with the Bloom filter array 208 or was not exposed to the media. In some such examples, randomly selected bits (e.g., the shaded bits 218) in the Bloom filter array 208 having a value of 0 are flipped to 1 with some probability p, and randomly selected bits having a value of 1 are flipped to 0 with some probability 1−q. In some examples, the values for the probabilities p and q for each particular element or bin in the Bloom filter may be the same as for every other element. In other examples, the probabilities p and q for each element in the Bloom filter may be independently defined. The random flipping of both 0s to 1s and 1s to 0s ensures that neither the presence of nor the absence of a single user identifier in the Bloom filter array can be verified with certainty.

Once a Bloom filter array includes noise to ensure differential privacy, the Bloom filter array may be shared with interested third parties without compromising the privacy of users. Accordingly, in some examples, each of the database proprietors 106a-b of FIG. 1 may provide such Bloom filter arrays to the AME 102 for aggregation and analysis. In some examples, the same media 114 may be accessed by different client devices 108 (associated with different users) via both the database proprietors 106a-b. Accordingly, in some such examples, both database proprietors 106a-b may generate a corresponding Bloom filter array representing summary statistics of the registered users for each database proprietors 106a-b associated with the corresponding client devices 108 that accessed the media 114. Based on the Bloom filter arrays (e.g., the sketch data 132a-b) obtained from each of the database proprietors 106a-b, the AME 102 may estimate the total number of unique (e.g., deduplicated) individuals that were exposed to the media. That is, the AME 102 may estimate the reach of the media. A challenge in making this determination is that some users registered with the first database proprietor 106a may also be registered with the second database proprietor 106b. If such users are exposed to the same media via both database proprietors 106a-b, both database proprietors would separately report the users' exposure to the media in their respective Bloom filter arrays resulting in a duplicate reporting of the user as an audience member exposed to the media. This problem can be compounded in situations where sketch data from more than two database proprietors are aggregated because there is no way to directly determine the number of users that may be subscribers of one database proprietor, multiple database proprietors, or all database proprietors. Furthermore, as described above, the summary statistics contained in the Bloom filter arrays are often differentially private such that the AME 102 cannot directly confirm whether a user is included in one, both, or neither Bloom filter array to appropriately resolve the duplication of audience members across different arrays.

Examples disclosed herein enable the estimation of the total number of unique (deduplicated) individuals represented across any number of Bloom filter arrays provided by any number of database proprietors. This process is sometimes referred to as estimating the cardinality of the union of the Bloom filter arrays. One challenge with cardinality estimates for Bloom filter arrays is that accurate results are very sensitive to the ratio of the unknown cardinality to the size (e.g., length) of the Bloom filter array. If the ratio is too low (e.g., the number of unique audience members represented in the Bloom filter array is small relative to the length of the array), the signal to noise of the sketch data drops to a level that makes cardinality estimations unreliable. That is, where there are relatively few people represented in a Bloom filter array, the amount of noise added to satisfy the requirements of differential privacy may make any inference of the actual data difficult. On the other hand, if the ratio is too high (e.g., the number of unique audience members represented in the Bloom filter array is large relative to the length of the array), the Bloom filter array becomes saturated (e.g., an overly large proportion of the bits are flipped to a value of 1) making it impossible to estimate the cardinality. The audience size is a function of the nature of the population targeted for the media and, therefore, cannot be modified. Thus, to maintain accurate estimations of cardinality, in some examples, the length of the Bloom filter array is adapted or selected to the particular size of the expected audience (e.g., universe estimate) to be represented by the Bloom filter array.

Examples disclosed herein enable the AME 102 to estimate the cardinality of a unioned set of Bloom filter arrays by numerically solving for the value of users (e.g., cardinality) that would produce the maximum likelihood of producing the unioned set of Bloom filter arrays based on known parameters of the Bloom filter arrays. In particular, in some examples, the known parameters include the type and/or number of hash function(s) used to map users to the Bloom filter arrays, the length of the Bloom filter arrays, and the parameters defining the distribution of the hash function(s) output (all Bloom filter arrays are distributed in the same manner). That is, in some examples, for the cardinality estimation to be reliable, the database proprietors 106a-b that generate the Bloom filter arrays agree to use the same hash function(s) to generate each Bloom filter array, the same length of Bloom filter array, and the same distribution for the Bloom filter array. Further, in some examples, the database proprietors 106a-b provide the noise parameters (e.g., probability p of flipping a 0 to a 1, and the probability 1−q of flipping a 1 to a 0 associated with each element in the Bloom filter array). In some examples, the noise parameters may be the same across different Bloom filter arrays. However, in other examples, the noise parameters may be different between different Bloom filter arrays.

The mathematical principles underlying the ability to estimate the cardinality of users represented in Bloom filter arrays can be expressed generally for any Bloom filter array $B=\{1, \ldots, m\}$, $m \geq 1$, with all values initialized to 0 and then individually flipped to 1 based on the allocation of N unique data entries (e.g., users exposed to media) across a database (e.g., the databases 124a-b) using a hash function that can be transformed to sample from any arbitrary distribution on the set $\{1, \ldots, m\}$. The sampling is deterministic, but random. That is, the same input yields the same output deterministically, but the distribution of the outputs across all uniform inputs follows the specified arbitrary distribution.

Let $r_k$ be a valid probability mass function across the indices or elements of the array, and $h(x)$ be the uniform hash function x. If the transformation function of $h(x)$ is defined as T, the probability that $h_1(x)=k$ (with $k \geq 1$) for any randomly picked element x equals $Pr(T(h_1(x)=k)=r_k$. The distribution can be arbitrary, parametric or non-parametric, uniform or non-uniform. For uniform distributions, $r_k=1/m$ for all $k=\{1, \ldots, m\}$, which corresponds to a standard Bloom filter array. An example of non-uniform parametric distribution would be a geometric distribution with parameter $\rho$ such that $r_k=(1-\rho)^{k-1}\rho$ for $k=\{1, \ldots, m\}$. As used herein, the term Bloom filter array refers to either a standard uniform array or a non-uniform array.

If n database proprietors (e.g., the database proprietors 106a-b) all agree on the same allocation probability distribution, the same set of h uniform hash functions, and the same transformation functions to convert a hash to a random sample, the database proprietors will generate a collection of n Bloom filter arrays each of length m. For purposes of explanation, the arrays themselves will be specified as $B^{(j)}$ for the Bloom filter array of jth database proprietor (also referred to herein simply as the jth Bloom filter array), and $B_k^{(j)}$ for the value at the kth element (e.g., bit index) within the jth the Bloom filter array.

Each database proprietor can also add differential privacy noise by incorporating random bit-flipping to partially obfuscate the true data represented in the original Bloom filter array. In some examples, the addition of noise is accomplished by defining two additional arrays for each Bloom filter array that also have a length m. For purposes of explanation, these two additional noise arrays are labeled $p^{(j)}$ and $q^{(j)}$, with the value in each index representing a Bernoulli probability of bit-flipping the respective value at $B_k^{(j)}$ depending on the current value of the corresponding element. The output is a new array, $S^{(j)}$, derived from the original Bloom filter array $B^{(j)}$.

$$Pr(S_k^{(j)} = 1) = \begin{cases} p_k^{(j)}, & \text{if } B_k^{(j)} = 0 \\ q_k^{(j)}, & \text{if } B_k^{(j)} = 1 \end{cases} \quad \text{Eq. 1}$$

Stated generally, Equation 1 represents that, for a given index k, if the value in the original Bloom filter array is a 0, it would bit-flip to a 1 with probability $p_k$ and stay unchanged with probability $1-p_k$. Likewise, if the value of the kth element is originally a 1, it would bit-flip to a 0 with probability $1-q_k$ and stay unchanged with probability $q_k$. There is no requirement that $p_k$ should numerically equal $q_k$ for any index, nor that $p_k$ or $q_k$ are constant across the indices. Indeed, there is no requirement that the database proprietors 106a-b agree on the probabilities used to introduce noise into their respective Bloom filter arrays. As an example, not incorporating any differential noise would have $p_k=0$ and $q_k=1$ for all indices.

In most cases, it is expected that the database proprietors 106a-b will use the same value of $\{p, q\}$ across all indices, such that the probabilities do not change from one element to another in a corresponding Bloom filter array. However, for generality, additional flexibility can be provided to have the probability depend on the index.

Typically, the database proprietors 106a-b will not provide the original arrays $\{B^{(1)}, \ldots, B^{(n)}\}$ because the data represented therein is not differentially private. However, in some examples, the database proprietors 106a-b will provide the noisy arrays $\{S^{(1)}, \ldots, S^{(n)}\}$ along with their respective sets of $\{p^{(j)}, q^{(j)}\}$ arrays. Thus, for purposes of explanation, the noisy arrays S are referred to herein as public Bloom filter arrays (or public sketch data for short), while the original arrays B are referred to herein as private Bloom filter arrays (or private sketch data for short).

Examples disclosed herein use all available information to estimate the total unique cardinality across the datasets among the n database proprietors 106a-b. The private Bloom filter arrays are latent variables because they are not directly observed or available but can be inferred from other variables that are observed or available. From this inference the cardinalities across the union of multiple Bloom filter arrays can be estimated.

To establish notational definitions and usage, first consider a single Bloom filter array provided by a single database proprietor. For purposes of this discussion, the superscript notation for different database proprietors is omitted because it is assumed that there is only one. Assuming that the database proprietor is to allocate A items (e.g., A subscribers) to a Bloom filter array, the probability that any specific index k, with the probability of being chosen being $r_k$, remains a 0 after all allocations is given by $$Pr(B_k = 0) = (1 - r_k)^A \quad \text{Eq. 2}$$

with $Pr(B_k=1)$ being the complement probability. Due to the addition of differential privacy noise, the probability of the public value $S_k$ being 0 or 1 not only depends on the private value $B_k$ but also on the bit-flipping probabilities going from $B_k$ to $S_k$.

$$Pr(S_k = 0) = Pr(S_k = 0 \mid B_k = 0)Pr(B_k = 0) + \quad \text{Eq. 3}$$
$$Pr(S_k = 0 \mid B_k = 1)Pr(B_k = 1)$$
$$Pr(S_k = 1) = Pr(S_k = 1 \mid B_k = 0)Pr(B_k = 0) +$$
$$Pr(S_k = 1 \mid B_k = 1)Pr(B_k = 1)$$

Using the $\{p_k, q_k\}$ notation defined above as $$p_k = Pr(S_k = 1 \mid B_k = 0) \quad \text{Eq. 4}$$
$$q_k = Pr(S_k = 1 \mid B_k = 1)$$

the probability of the public values being 0 or 1 can be compactly expressed as $$Pr(S_k = 0) = (1 - q_k) - (p_k - q_k)(1 - r_k)^A \quad \text{Eq. 5}$$
$$Pr(S_k = 1) = q_k + (p_k - q_k)(1 - r_k)^A$$

The log-likelihood is then given as $$\ell(N \mid \Omega) = \sum_{k=1}^{n} [S_k = 0]\log(Pr(S_k = 0)) + [S_k = 1]\log(Pr(S_k = 1)) \quad \text{Eq. 6}$$

where $\Omega$ is the set of all known background knowledge. In particular, $\Omega$ is conditioned on (1) the public Bloom filter array $S_k$, (2) the probability assignment $r_k$ within the array, and (3) the bit-flipping noise probabilities $\{p_k, q_k\}$. The bracket notation, [P], is the Iverson bracket, which is defined as $$[P] = \begin{cases} 1 & \text{if } P \text{ is true} \\ 0 & \text{otherwise} \end{cases} \quad \text{Eq. 7}$$

The analysis of two Bloom filter arrays (provided from two database proprietors) involves the joint distribution of seeing any combination of the values {0, 1} across both Bloom filter arrays. Let $\{N_{10}, N_{01}, N_{11}\}$ be the cardinalities of the disjoint sets between the two arrays, with $N_{10}$ being the cardinality of the set of users in the first dataset (of the first database proprietor) but not in the second dataset (of the second database proprietor), $N_{01}$ being the cardinality of the set of users in the second dataset but not in the first dataset, and $N_{11}$ being the cardinality of the set of users contained in both the first and second datasets. Based on these definitions, the joint distribution of the four possibilities for the private Bloom filter array at index k can be expressed as $$Pr(B_k = (0, 0)) = (1 - r_k)^{(N_{10} + N_{01} + N_{11})} \quad \text{Eq. 8}$$
$$Pr(B_k = (1, 0)) = \left(1 - (1 - r_k)^{(N_{10})}\right)(1 - r_k)^{(N_{01} + N_{11})}$$
$$Pr(B_k = (0, 1)) = \left(1 - (1 - r_k)^{(N_{01})}\right)(1 - r_k)^{(N_{10} + N_{11})}$$
$$Pr(B_k = (1, 1)) = 1 - Pr(B_k = (0, 0)) - Pr(B_k = (1, 0)) - Pr(B_k = (0, 1))$$

Letting $A^{(1)}$ and $A^{(2)}$ be cardinalities of the respective datasets represented in the separate Bloom filter arrays, and using the fact that $$A^{(1)} = N_{10} + N_{11} \quad \text{Eq. 9}$$
$$A^{(2)} = N_{01} + N_{11}$$

the joint distribution can be expressed with $N_{11}$ as the only unknown $$Pr(B_k = (0, 0)) = (1 - r_k)^{(A^{(1)} + A^{(2)} - N_{11})} \quad \text{Eq. 10}$$
$$Pr(B_k = (1, 0)) = \left(1 - (1 - r_k)^{(A^{(1)} - N_{11})}\right)(1 - r_k)^{(A^{(2)})}$$
$$Pr(B_k = (0, 1)) = \left(1 - (1 - r_k)^{(A^{(2)} - N_{11})}\right)(1 - r_k)^{(A^{(1)})}$$
$$Pr(B_k = (1, 1)) = 1 - Pr(B_k = (0, 0)) - Pr(B_k = (1, 0)) - Pr(B_k = (0, 1))$$

Thus, the object is to estimate $N_{11}$, the only unknown, to then determine the cardinality of the union, which is equal to $N_{10} + N_{01} + N_{11} = A^{(1)} + A^{(2)} - N_{11}$. However, the inference is made more difficult by the inclusion of differential noise bit-flipping. Table 1 sets forth all combinations of applying differential privacy among two Bloom filter arrays to account for the resulting bit-flipping. For purposes of clarity, the array position index k as a subscript is not shown in Table 1.

TABLE 1

|  |  | B (private) | | | |
| --- | --- | --- | --- | --- | --- |
|  |  | (0, 0) $p(B_{00})$ 0 | (0, 1) $p(B_{01})$ 1 | (1, 0) $p(B_{10})$ 1 | (1, 1) $p(B_{11})$ 1 |
| S (public) | (0, 0) 0 | $(1 - p^{(1)})(1 - p^{(2)})$ | $(1 - p^{(1)})(1 - q^{(2)})$ | $(1 - q^{(1)})(1 - p^{(2)})$ | $(1 - q^{(1)})(1 - q^{(2)})$ |
|  | (0, 1) 1 | $(1 - p^{(1)})p^{(2)}$ | $(1 - p^{(1)})q^{(2)}$ | $(1 - q^{(1)})p^{(2)}$ | $(1 - q^{(1)})q^{(2)}$ |
|  | (1, 0) 1 | $p^{(1)}(1 - p^{(2)})$ | $p^{(1)}(1 - q^{(2)})$ | $q^{(1)}(1 - p^{(2)})$ | $q^{(1)}(1 - q^{(2)})$ |
|  | (1, 1) 1 | $p^{(1)}p^{(2)}$ | $p^{(1)}q^{(2)}$ | $q^{(1)}p^{(2)}$ | $q^{(1)}q^{(2)}$ |
|  | Total | 100% | 100% | 100% | 100% |

The columns in Table 1 correspond to the joint values for two private (unknown) Bloom filter arrays generated by different database proprietors prior to the inclusion of noise. The rows in Table 1 correspond to the joint values for the public Bloom filter arrays generated by each database provider after adding bit-flipping noise with probabilities {p, q}, which may differ between the two database proprietor as noted by the superscripts. The header above each column indicates the corresponding combination of private joint-values, the respective probability of seeing that combination, and the result of their bitwise union. The values in Table 1 are the conditional probabilities that a specific private joint combination can turn into specific public joint combination. That is, for any input, the output must be one of the four rows, which is why the columns sum to 100%. The dashed lines in Table 1 partition the values in the table into four regions based on the bitwise union of the private and public Bloom filter arrays based on the bitwise union of the arrays.

Based on the law of total probability, the unconditional probability of seeing each private-joint value is given by $$Pr(B_k = (0, 0)) = \quad \text{Eq. 11}$$
$$p(B_{00})\left(1 - p^{(1)}\right)\left(1 - p^{(2)}\right) + \ldots p(B_{01})\left(1 - p^{(1)}\right)\left(1 - q^{(2)}\right) +$$
$$\ldots p(B_{10})\left(1 - q^{(1)}\right)\left(1 - p^{(2)}\right) + \ldots p(B_{11})\left(1 - q^{(1)}\right)\left(1 - q^{(2)}\right)$$
$$Pr(B_k = (0, 1)) = p(B_{00})\left(1 - p^{(1)}\right)p^{(2)} +$$
$$\ldots p(B_{01})\left(1 - p^{(1)}\right)q^{(2)} + \ldots p(B_{10})\left(1 - q^{(1)}\right)p^{(2)} + \ldots p(B_{11})\left(1 - q^{(1)}\right)q^{(2)}$$

-continued
$$Pr(B_k = (1, 0)) = p(B_{00})p^{(1)}(1 - p^{(2)}) +$$
$$\ldots p(B_{01})p^{(1)}(1 - q^{(2)}) + \ldots p(B_{10})q^{(1)}(1 - p^{(2)}) + \ldots p(B_{11})q^{(1)}(1 - q^{(2)})$$
$$Pr(B_k = (1, 1)) =$$
$$p(B_{00})p^{(1)}p^{(2)} + \ldots p(B_{01})p^{(1)}q^{(2)} + \ldots p(B_{10})q^{(1)}p^{(2)} + \ldots p(B_{11})q^{(1)}q^{(2)}$$

The above probabilities produce the log-likelihood of $$\ell(N_{11} \mid \Omega) = \sum_{k=1}^{m} [S_k = (0, 0)]\log(p(S_{00})) + \ldots [S_k = (1, 0)]\log(p(S_{10})) + \ldots [S_k = (0, 1)]\log(p(S_{01})) + \ldots [S_k = (1, 1)]\log(p(S_{11}))$$

Eq. 12 where $\Omega$ is the set of all known background knowledge for two Bloom filter arrays, which includes (1) the individual cardinalities $\{A^{(1)}, A^{(2)}\}$ for the Bloom filter arrays, (2) the public Bloom filter arrays, $S^{(1)}$ and $S^{(2)}$, (3) the bit-flipping noise probabilities, $\{p^{(1)}, q^{(1)}\}$ and $\{p^{(2)}, q^{(2)}\}$, and (4) the probability distribution, $r_k$, of index k being allocated a user within the Bloom filter arrays. Once $N_{11}$ is estimated, the total cardinality of the union of the two Bloom filter arrays is given by $A^{(1)}+A^{(2)}-N_{11}$.

The likelihood equations for two Bloom filter arrays (shown in Equation 12) is more complicated than the likelihood equation for a single Bloom filter array (shown in Equation 6). The likelihood equations grow significantly more complicated as the number of Bloom filter increase to 3 or more arrays. Furthermore, the number of mutually exclusive partitions increases as $2^n$, when n is the number of Bloom filter arrays under consideration. For example, with two Bloom filter arrays, only a single variable is unknown (the intersection of the cardinality ($N_{11}$). For three Bloom filter arrays, there are eight unknowns subject to three constraints corresponding to the individual cardinalities of each array. Thus, the above process to estimate the cardinality across multiple (e.g., more than 2) Bloom filter arrays is not scalable. Examples disclosed herein overcome these difficulties by estimating the cardinality of n Bloom filter arrays in a piecemeal fashion by analyzing two of the arrays at a time as defined in a binary tree structure.

As noted above, in addition to each database proprietor 106a-b providing a public Bloom filter array (that has differential privacy bit-flipping noise), the database proprietors 106a-b also provide a pair of arrays defining the probabilities for the bit-flipping noise. In some examples, the bit-flipping probabilities are consistent across all elements of the Bloom filter array. However, in other examples, the bit-flipping probabilities can differ between different indices or elements of the array. Furthermore, the probabilities used by different ones of the database proprietors 106a-b when adding noise to their respective Bloom filter arrays need not be the same probabilities used by other database proprietors. For purposes of explanation, the respective noise probabilities of the kth index for the jth Bloom filter array (generated by the jth database proprietor) are labelled $p_k^{(j)}$ and $q_k^{(j)}$.

For purposes of illustration, consider two private (e.g., no noise) Bloom filter arrays, $B_x$ and $B_y$, generated by the two database proprietors 106a-b of FIG. 1. The database proprietors 106a-b add differential privacy noise to create respective public Bloom filter arrays, $S_x$ and $S_y$, which may be combined as a bitwise union to produce a combined Bloom filter array $S_{xy}$.

$$\left.\begin{array}{l} B_x + (p_x, q_x) \to S_x \\ B_y + (p_y, q_y) \to S_y \end{array}\right\} \to S_{xy}$$

Eq. 13

A combined Bloom filter array generated from the bitwise union of two or more other Bloom filter arrays is sometimes referred to herein as a composite Bloom filter array. Rather than adding noise to each of the private Bloom filter arrays ($B_x$ and $B_y$) individually and then producing a composite Bloom filter array ($S_{xy}$) from the bitwise union of the result, it is possible to arrive at the same final Bloom filter array ($S_{xy}$) following a reversed order of operations by defining effective noise probabilities. That is, the same final Bloom filter array ($S_{xy}$) of Equation 13 can be produced by first generating an intermediate composite Bloom filter array from the bitwise union of the private Bloom filter arrays and then adding noise as represented in Equation 14.

$$\left.\begin{array}{l} B_x \\ B_y \end{array}\right\} \to B_{xy} + (\overline{p}_{xy}, \overline{q}_{xy}) \to S_{xy}$$

Eq. 14

The noise added in Equation 14 corresponds to a single pair of arrays of noise probabilities that produce the same effect on the bitwise union of two private Bloom filter arrays as the two pairs of arrays of noise probabilities applied respectively to the two private Bloom filter arrays that are then bitwise unioned. The noise added in Equation 14 is referred to herein as effective noise and the associated probabilities are referred to herein as effective noise probabilities.

While the contents of each private Bloom filter array is known to each corresponding database proprietor that generated the arrays, such arrays are kept private to preserve privacy. As a result, it is not possible to generate the intermediate composite Bloom filter array ($B_{xy}$) of Equation 14 corresponding to the bit-wise union of the two private Bloom filter arrays (e.g., prior to the addition of differential privacy noise). Thus, the intermediate composite Bloom filter array is referred to herein as a latent Bloom filter array that constitutes a latent variable that, in combination with the arrays of effective noise probabilities, can replicate the probabilistic behavior of the public composite Bloom filter array $S_{xy}$ of Equation 13 (which can be generated because it is based on the public Bloom filter arrays shared by the database proprietors 106a-b). In other words, the effective noise arrays $\{\overline{p}_{xy}, \overline{q}_{xy}\}$ define probabilities for bit-flipping values in individual elements of the latent Bloom filter array ($B_{xy}$) that would result in the composite Bloom filter array ($S_{xy}$).

The above process defining effective noise by reversing the operations of the addition of noise and the bitwise union of the Bloom filter arrays is analogous for number of Bloom filter arrays. For example, the actual process to combine three different Bloom filter arrays into a final composite Bloom filter array can be expressed as follows.

$$\left.\begin{array}{l} B_x + (p_x, q_x) \to S_x \\ B_y + (p_y, q_y) \to S_y \\ B_z + (p_z, q_z) \to S_z \end{array}\right\} \to S_{xyz}$$

Eq. 15

The final composite Bloom filter array of Equation 15 can be replicated by first estimating the effective noise for the first two Bloom filter arrays (as in Equation 14), and then using known probabilities directly to incorporate the third array.

$$\left. \begin{array}{r} B_x \\ B_y \end{array} \right\} \to B_{xy} + (\overline{p}_{xy}, \overline{q}_{xy}) \to S_{xy} \\ B_z + (p_z, q_z) \to S_z \right\} \to S_{xyz} \qquad \text{Eq. 16}$$

Figure 3:
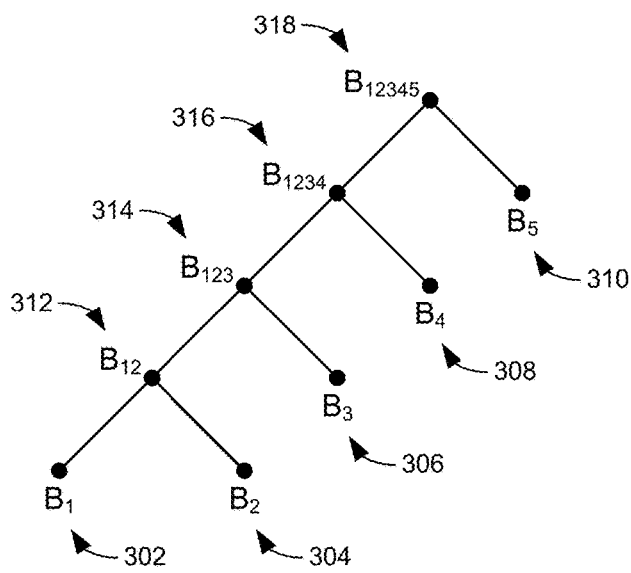
FIGS. 3-5 illustrate different example topologies for a binary tree defining different ways to combine five different Bloom filter arrays into a final composite Bloom filter array.

The method of including or combining one additional Bloom filter array at a time is analogous to a daisy chain. FIG. 3 illustrates an example daisy chain to combine five different Bloom filter arrays 302, 304, 306, 308, 310 that are labelled as $B_1$, $B_2$, $B_3$, $B_4$, $B_5$, respectively. As described above, each of the five different Bloom filter arrays 302, 304, 306, 308, 310 are public arrays with differential noise already incorporated therein. As shown in the illustrated example, the first combination of Bloom filter arrays includes the first two arrays 302, 304 to produce a first intermediate composite Bloom filter array 312. The first intermediate composite Bloom filter array 312 is then combined with the third Bloom filter array 306 to produce a second intermediate composite Bloom filter array 314, which is then combined with the fourth Bloom filter array 308 to produce a third intermediate composite Bloom filter array 316. Finally, the third intermediate composite Bloom filter array 316 is combined with the fifth Bloom filter array 310 to produce the final composite Bloom filter array 318 that represents the combination of all five original Bloom filter arrays 302, 304, 306, 308, 310.

Figure 4:
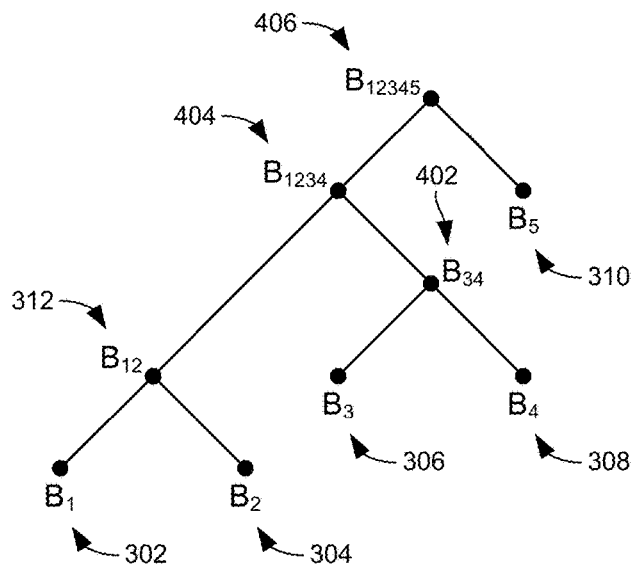

The topology used to combine multiple Bloom filter arrays does not need to be a daisy chain but can follow any suitable binary tree structure. For example, FIG. 4 illustrates another example binary tree structure to combine the five Bloom filter arrays 302, 304, 306, 308, 310. In this example, the first two Bloom filter arrays 302, 304 are combined as above to produce the first intermediate composite Bloom filter array 312. However, rather than adding the third Bloom filter array 306 to the first intermediate composite Bloom filter array 312, the third and fourth Bloom filter arrays 306, 308 are separately combined into a distinct intermediate composite Bloom filter array 402 that is then combined with the first intermediate composite Bloom filter array 312 to produce the third intermediate composite Bloom filter array 404. As shown in the illustrated examples, both the third intermediate composite Bloom filter array 404 in FIG. 4 and the third intermediate composite Bloom filter array 316 of FIG. 3 are based on the combination of the first four Bloom filter arrays 302, 304, 306, 308. However, the resulting third intermediate composite arrays 316, 404 may not be identical because they were generated based on a different ordering in which the different Bloom filter arrays 302, 304, 306, 308 are combined. Finally, as shown in FIG. 4, the third intermediate composite Bloom filter array 402 is combined with the fifth Bloom filter array 310, similar to what is represented in FIG. 3, to produce the final composite Bloom filter array 406. However, as noted above, the final composite Bloom filter array 406 of FIG. 4 may not be identical to the final composite Bloom filter array 318 of FIG. 3 due to the different combination of arrays used to arrive at the final array.

Figure 5:
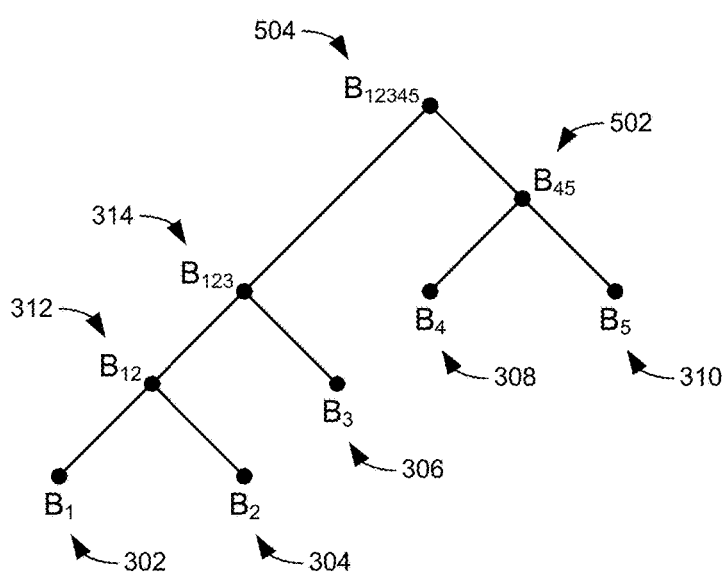

FIG. 5 illustrates another example binary tree structure to combine the five Bloom filter arrays 302, 304, 306, 308, 310. In this example, the first three Bloom filter arrays 302, 304, 306 are combined in the same manner as outlined above in FIG. 3 to produce the first intermediate composite Bloom filter array 312 and then the second intermediate composite Bloom filter array 314. However, unlike in FIG. 3, in the illustrated example of FIG. 5, the fourth and fifth Bloom filter arrays 308, 310 are separately combined into a distinct intermediate composite Bloom filter array 502 that is then combined with the second intermediate composite Bloom filter array 314 to produce a final composite Bloom filter array 504. As above, the final composite Bloom filter array 504 of FIG. 5 may not be identical to either of the final composite Bloom filter array 318, 406 of FIGS. 3 and 4 due to the different combination of arrays used to arrive at the final array. While the final composite Bloom filter array may vary depending upon the particular topology used to combine the original Bloom filter arrays 302, 304, 306, 308, 310, any one of the topologies will produce a reliable composite Bloom filter array that can be used to accurately estimate the cardinality of the union of all of the original Bloom filter arrays 302, 304, 306, 308, 310.

In general terms, as used herein, a tree is a data structure with a collection of nodes and edges. Each node may be connected to higher or lower in the tree. In a pair of connected nodes in a tree, the node that is higher in the tree is called a parent to the connected node that is lower in the tree, and the lower node is referred to as a child to the parent (higher) node. Nodes with no children are called leaves and the node with no parent (e.g., the highest node in the tree) is called the root. Thus, in the illustrated examples of FIGS. 3-5, each of the five original Bloom filter arrays 302, 304, 306, 308, 310 corresponds to leaves in the tree and the final composite Bloom filter array 318 corresponds to the root of the tree. The height of a particular node in a tree is the number of edges on the longest path from the particular node to a leaf. Thus, a leaf node has a height of zero. The height of a tree is the height of the root node in the tree, or equivalently, the depth of its deepest node. Thus, the height of the example tree represented in FIG. 3 is four and the height of the example trees represented in FIGS. 4 and 5 is three.

A binary tree is a tree in which each node has, at most, two children. A strict binary tree is a tree in which each node (except for the leaves) has exactly two children. The following disclosure uses strict binary trees. However, for the sake of brevity, the more general term of "binary tree" will be used throughout.

A given node, i, in a (strict) binary tree, T, has a height defined as $h_i$, children defined as $\{i_1, i_2\}$, and a parent defined as $i_0$. The height of the tree is the maximum height across all individual heights for each node in the tree (e.g., $h_T = \max\{h_i\}$). As noted above, the leaves of the binary tree correspond to the individual public Bloom filter arrays provided by the database proprietors 106a-b. Thus, if there are n database proprietors that each provide one Bloom filter array, there will be n leaves in the binary tree. A strict binary tree with n leaves has exactly (2n−1) nodes. The labelling of the nodes to the Bloom filter arrays can be arbitrary (e.g., they do not need to be in any particular order). However, for purposes of explanation, the nodes $\{1, \ldots, n\}$ are the leaves for the $1^{st}$ through nth Bloom filter array provided by the $1^{st}$ through nth database proprietor.

For nodes i>n (e.g., the non-leaves) the following definitions apply recursively:

Eq. 17

$S^{\{i\}}$: composite Bloom filter array corresponding to the bitwise union of $S^{\{i_1\}}$ and $S^{\{i_2\}}$ (e.g., union of children)

$A^{\{i\}}$: estimated cardinality among all descendants $\{p^{\{i\}}, q^{\{i\}}\}$: effective noise probabilities For nodes i≤n (e.g., the leaves), the above terms are known values provided by the database proprietors. That is, $S^{\{i\}}$ is the ith public Bloom filter array from the ith database proprietor, $A^{\{i\}}$ is the true cardinality for the ith public Bloom filter array, and $\{p^{\{i\}}, q^{\{i\}}\}$ is the actual differential noise probabilities used by the ith database proprietor to generate the ith public Bloom filter array.

For purposes of explanation, let $\Psi_h$ be the set of all nodes at the same height, h. Nodes at the same height are independent of each other and can be analyzed in parallel. The particular process to analyze a binary tree begins by identifying the set of nodes at the height $\Psi_h$ for each h=1, . . . , $h_T$. For each non-leaf node in a particular set ($\Psi_h$) of nodes at a given height, the intersection cardinality (and, therefore, the cardinalities of the three disjoint sets) between the node's two children is estimated, $A^{\{i\}}$ and $S^{\{i\}}$ are updated, and the corresponding effective noise probabilities $\{p^{\{i\}}, q^{\{i\}}\}$ are determined. This process is repeated for all nodes in a given set ($\Psi_h$) corresponding to a given height in the tree before repeating the process for all nodes at the next height up the binary tree. Thus, the process begins at the lowest non-leaf set of nodes (h=1) and repeats until the single root node at the top of the tree (at h=$h_T$) is analyzed.

As discussed above, Table 1 includes dashed lines partitioning the table into four sections. The four sections of the table represent the four combinations of the bitwise union between the private joint values and the public joint values. For a specific node in a binary tree with two children, an estimate of $\{p(B_{00}), p(B_{01}), p(B_{10}), p(B_{11})\}$ is known from the cardinality estimation at each node. Additionally, the bitwise noise arrays of $\{p, q\}$ for each child is also known. For notational clarity, let the following substitutions apply to terms in Table 1:

$$\{p^{(1)}, q^{(1)}\} \leftarrow \{p^{\{i_1\}}, q^{\{i_1\}}\}$$
$$\{p^{(2)}, q^{(2)}\} \leftarrow \{p^{\{i_2\}}, q^{\{i_2\}}\}$$
$$B_{x,y} \leftarrow B_{i_1, i_2}$$
$$S_{x,y} \leftarrow S_{i_1, i_2}$$

Eq. 18

The values for $S_{x,y}$ are known as they correspond either to the public Bloom filter arrays provided by the database proprietors or to a composite Bloom filter array derived from the public Bloom filter arrays provided by the database proprietors. Further, as discussed above the bit-flipping noise p is defined as the probability of a 0 flipping to a 1. Thus, based on the knowledge of $S_{x,y}$, the corresponding row in Table 1 can be identified in conjunction with the first column (corresponding to beginning value of 0) for the relevant probabilities. Notably, for $S_{x,y}$=(0,0), Table 1 shows the probability of a 0 remaining as a 0 (rather than flipping to a 1). Thus, the complement of the probability for $S_{x,y}$=(0,0) provided in Table 1 is used to define the bit flipping noise probability p. This yields an effective bit-flipping probability, $\bar{p}$, conditioned on the current state given below $$\bar{p} = \begin{cases} 1 - (1-p^{(1)})(1-p^{(2)}) & S_{x,y} = (0,0) \\ (1-p^{(1)})p^{(2)} & S_{x,y} = (0,1) \\ p^{(1)}(1-p^{(2)}) & S_{x,y} = (1,0) \\ p^{(1)}p^{(2)} & S_{x,y} = (1,1) \end{cases}$$

Eq. 19

The derivation for the effective bit-flipping probability, $\bar{q}$, is slightly more complicated. As discussed above, 1−q is the probability of a particular bit flipping from a 1 to a 0. For a particular row in Table 2, the relevant probabilities corresponds to one of the three last columns. As indicated by the column headers and right margin, the probabilities in the last three columns represent a bit value of 1 staying as a 1. The problem is that the table is conditioned on the rows. Taking the second row by way of example $$(\bar{q} \mid S_{x,y} = (0,1)) = \frac{p(B_{01})(1-p^{(1)})q^{(2)} + p(B_{10})(1-q^{(1)})p^{(2)} + p(B_{11})(1-q^{(1)})q^{(2)}}{p(B_{01}) + p(B_{10}) + p(B_{11})}$$

$$= \frac{p(S_{01}) - p(B_{00})(1-p^{(1)})p^{(2)}}{p(B_{01}) + p(B_{10}) + p(B_{11})}$$

$$= \frac{p(S_{01}) - p(B_{00})(1-p^{(1)})p^{(2)}}{1 - p(B_{00})}$$

$$= \frac{p(S_{01}) - p(B_{00})\bar{p}}{1 - p(B_{00})}$$

Eq. 20 where $\bar{p}$ was solved directly as defined in Equation 19 above. Similar procedures for the other three conditions can be followed. For $S_{x,y}$=(0,0), the process is slightly different because it corresponds to the quadrant of Table 1 above the dashed line, which represents 1−$\bar{q}$. If an intermediate variable, r, is defined such that $$r = \begin{cases} \frac{Pr(S_{00}) - Pr(B_{00})(1-\bar{p})}{1 - Pr(B_{00})} & S_{x,y} = (0,0) \\ \frac{Pr(S_{x,y}) - Pr(B_{00})(1-\bar{p})}{1 - Pr(B_{00})} & \text{otherwise} \end{cases}$$

Eq. 21 then $\bar{q}$ is directly related as $$\bar{q} = \begin{cases} 1 - r & S_{x,y} = (0,0) \\ r & \text{otherwise} \end{cases}$$

Eq. 22

As described above, the noise probabilities $\bar{p}$ and $\bar{q}$ are vectors or arrays, and not scalers. Further, the arrays not only depend on the index within the array, but also on the underlying Bloom filter arrays that contributed to the composite Bloom filter array under analysis, which depends upon the particular node in the binary tree under analysis and the output of the prior analysis of the descendants of that particular node. Once $\bar{p}$ and $\bar{q}$ are determined, as arrays, the noise arrays for the corresponding binary tree node under analysis can be defined $$\{p^{[i]}, q^{[i]}\} \leftarrow \{\bar{p}, \bar{q}\}$$

Eq. 23

The final result of Equation 23 can be used in the next iteration of the process at a higher node up the binary tree.

As discussed above, the particular topology of a binary tree is not required. Furthermore, as noted above, there is no required order in which individual Bloom filter arrays are associated with individual leaves of the binary tree. In some examples, the topology and ordering of the Bloom filter arrays is defined in advance based on default settings. In other examples, as discussed further below, the topology and ordering of the Bloom filter arrays is dynamically defined. Although transversal of the tree can theoretically be done in parallel for all nodes at the same height, on standard transversal that could be used is a postorder transversal.

While any topology and any ordering of Bloom filter arrays to be assigned to the corresponding leaves in a binary tree is possible, not all topologies and orderings are equal. As discussed above in connection with FIGS. 3-5, each of the final composite Bloom filter arrays 318, 406, 504 may differ somewhat from the others because of the different structure of the binary tree used to generate the final composite array. In some instances, particular combinations of particular Bloom filter arrays to form composite arrays that may then be combined with other composite arrays can produce more reliable estimates of the overall cardinality for n Bloom filter arrays. More particularly, examples disclosed herein involve a process to produce a local optimum by dynamically constructing the binary tree as separate pairs of Bloom filter arrays are analyzed to produce new composite Bloom filter arrays.

The process for dynamically constructed a binary tree begins by generated a scalar measurement of the overall noise within an array. Specifically, a scalar that approximates the behavior of the overall noise can be defined using $\{p_k, q_k\}$ as a measurement of noise for each index with the values of $p_k=0$ and $q_k=1$ representing no differential privacy noise. An example of such an approximation is $$e^{(j)} = 1 - \overline{|p^{(j)} - q^{(j)}|}$$

Eq. 24

$$= 1 - \frac{1}{n}\sum_{k=1}^{n}|p_k^{(j)} - q_k^{(j)}|$$

Another example scaler that serves as an approximation of the overall noise is the root mean square $$e^{(j)} = 1 - \text{RMS}[p^{(j)} - q^{(j)}]$$

Eq. 25

$$= 1 - \sqrt{\frac{1}{n}\sum_{k=1}^{n}(p_k^{(j)} - q_k^{(j)})^2}$$

Both the absolute value (Equation 24) and the squaring (Equation 25) are symmetric functions of (p–q) for each index. There are two rationales for a symmetric function of (p–q). First, the inference power of cardinality estimation mostly depends on the difference of the noise and not the individual components under analysis. If the difference is 0, then no inference on the cardinality is possible. The second reason for a symmetric function of (p–q) is that, although $\{p_k, q_k\}=\{0, 1\}$ corresponding to no bit-flipping noise, the symmetric values of $\{p_k, q_k\}=\{1, 0\}$ corresponds to complete bit-flipping (e.g., every 0 flips to a 1 and every 1 flips to a 0) without loss of inferential information.

The estimation of the overall noise (e) in Equations 24 and 25 is referred to herein as the effective noise error. Notably, the effective noise error is distinct from the error of the cardinality estimate. Rather, the effective noise error is a summary of the "noisiness" of an array as a whole. Both symmetric functions given in Equations 24 and 25 are subtracted from 1 to make the minimum result (e=0) equivalent to no noise.

Dynamic construction of a binary tree is accomplished by first calculating the effective noise error ($e^{(j)}$) for each Bloom filter array to be combined and sorting the results from low to high. Next, the two Bloom filter arrays with the lowest effective noise error are combined to produce a composite Bloom filter array with associated effective noise probabilities. The effective noise error for the newly generated composite Bloom filter array is calculated and sorted from low to high with the other Bloom filter arrays yet to be combined. This process then repeats such that each subsequent pair of Bloom filter arrays that are merged into a new composite Bloom filter array corresponds to the two Bloom filter arrays with the lowest effective noise errors.

As a specific example, let parentheses indicate a bit-wise union update between two Bloom filter arrays, along with cardinality estimation and effective noise calculations. Assume there are five original Bloom filter arrays to be combined with the original ordering of the effective noise error from low-to-high being {4, 3, 1, 5, 2}. In such a scenario, Bloom filter arrays 3 and 4 are combined via bitwise union to form a first composite Bloom filter array. The effective noise error for the first composite Bloom filter array is calculated and the result is sorted from low-to-high with the other remaining arrays to result in {1, 5, (4, 3), 2}. Based on the ordering of the effective noise errors, Bloom filter arrays 1 and 5 are combined to generate a second composite Bloom filter array. Calculating the new effective noise error and reordering the remaining effective noise errors results in {(4, 3), 2, (1, 5)}. Based on this ordering of the effective noise errors, the first composite Bloom filter array is combined with the Bloom filter array 2 to generate a third composite Bloom filter array. At this point, there are only two composite Bloom filter arrays left to combine (1, 5) and ((4, 3), 2). Accordingly, these two composite arrays are combined to generate the final composite Bloom filter array from which the overall cardinality across all five original Bloom filter arrays may be estimated.

Figure 6:
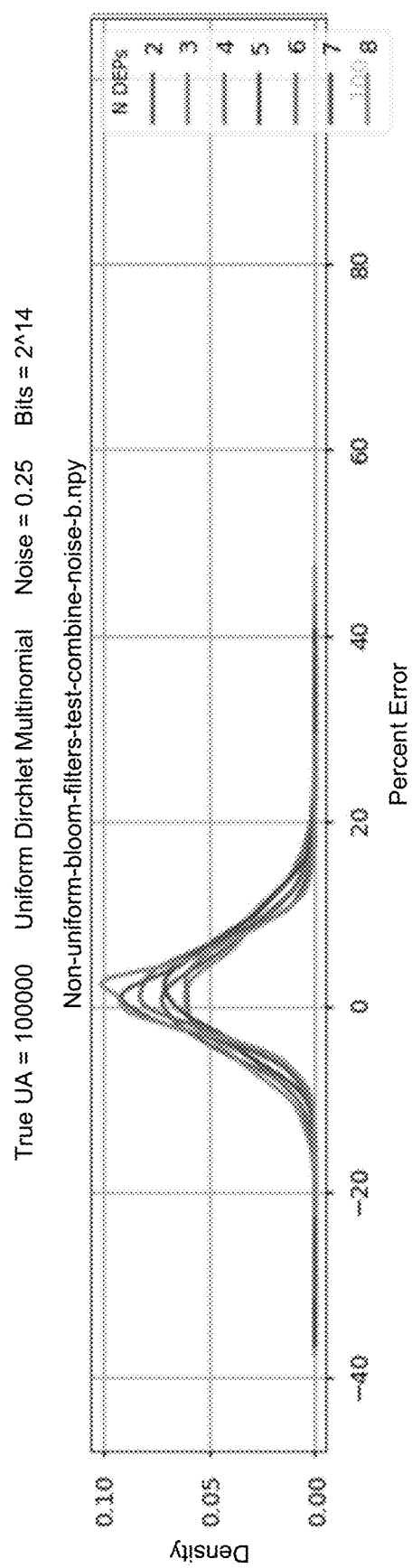
FIG. 6 is a graph showing the error resulting in experimental tests implementing teachings disclosed herein.

Experimental testing has shown that a fixed (e.g., not dynamically constructed) daisy chain tree structure (as shown in FIG. 3) with the original public Bloom filter arrays orders from lowest effective noise error to highest effective noise error results in cardinality estimations that are nearly unbiased within the simulation. In particular, test results are shown in FIG. 6 for up to 8 different Bloom filter arrays, all of which included differential privacy noise. As can be seen, the percent error remains nearly at 0 for a near unbiased estimate of the cardinality (e.g., unique audience).

Figure 7:
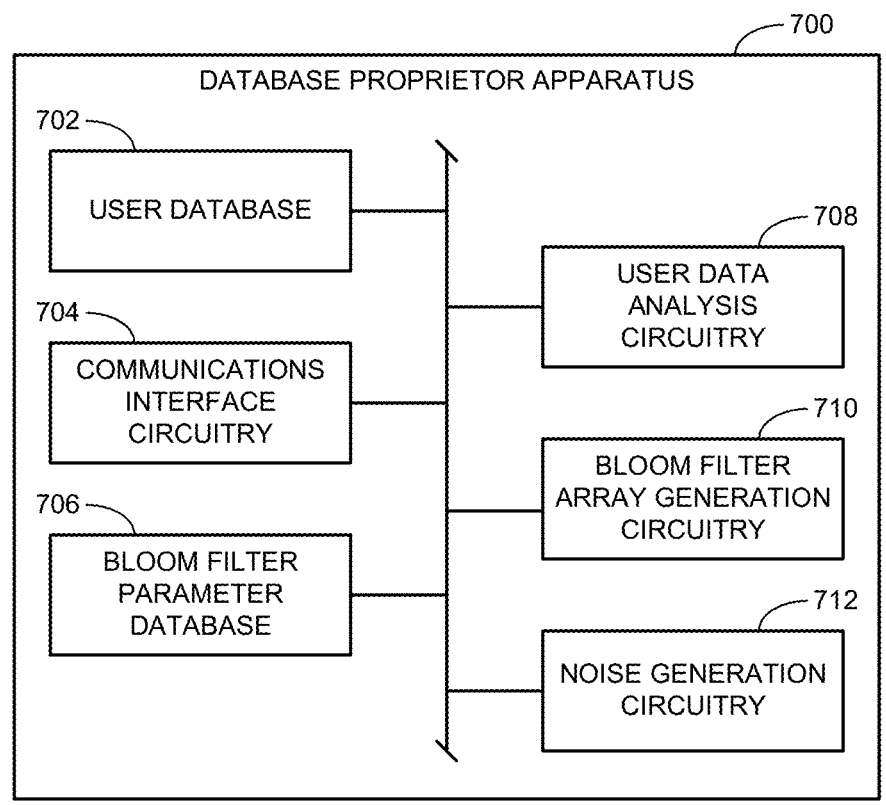
FIG. 7 is a block diagram of an example database proprietor apparatus of any one of the database proprietors of FIG. 1.

FIG. 7 is a block diagram of an example database proprietor apparatus 700. The example database proprietor apparatus 700 of FIG. 7 may correspond to any one of the database proprietors 106a-b of FIG. 1. As shown in the illustrated example, the database proprietor apparatus 700 includes an example user database 702, an example communications interface circuitry 704, an example Bloom filter parameter database 706, an example user data analysis circuitry 708, an example Bloom filter array generation circuitry 710, and an example noise generation circuitry 712.

The example user database 702 stores user data associated with users (e.g., subscribers) registered with the database proprietor apparatus 700. In some examples, the user data includes a user identifier corresponding to any suitable PII.

The example communications interface circuitry 704 enables the database proprietor apparatus 700 to communicate with the AME 102.

The example Bloom filter parameter database 706 stores the Bloom filter parameters used to define and/or generate one or more Bloom filter arrays representative of the users in the user database 702. In some examples, some or all of the Bloom filter parameters are determined and/or received from the AME 102 (e.g., via the communications interface circuitry 704). In some examples, some or all of the Bloom filter parameters are determined by one or more database proprietors 106a-b. In some examples, the Bloom filter parameters include one or more of a length (e.g., number of bits or elements) in the Bloom filter array, the identification of one or more hash function(s) used to map users to different elements of the Bloom filter array, the distribution of outputs of the hash function(s) across the different bits of the Bloom filter array and the corresponding mapping of hash function outputs to the different elements in the array (e.g., parameters defining the number of different hash function outputs that map to each element and the particular outputs that map to each particular element), and/or noise parameters (e.g., the bit-flipping probabilities $\{p_k, q_k\}$) to ensure differential privacy. Regardless of how the Bloom filter parameters are set or determined (e.g., whether by the AME 102 and/or the database proprietors 106a-b), the Bloom filter array length, hash function(s), and corresponding hash function output mapping are to be agreed upon by all database proprietors 106a-b. However, as mentioned above, each database proprietor 106a-b may use different noise parameters to add noise to its respective Bloom filter array. Furthermore, in some examples, the noise parameters used by a particular database proprietor 106a-b correspond to a pair of noise probability arrays having the same length as the Bloom filter arrays with the values in each element of the two arrays corresponding to respective values for the probabilities p and q used to determine whether to flip the initial value of the Bloom filter array when adding noise. In some examples, the probabilities in the each of the two arrays may be consistent across all elements in the corresponding arrays. However, in other examples, the noise probability arrays have different values associated with different elements of the corresponding Bloom filter array.

The example user data analysis circuitry 708 analyzes user data in the user database 702 to identify users that accessed media for which the AME 102 is interested in generating audience measurement metrics. The example Bloom filter array generation circuitry 710 generates Bloom filter arrays based on the Bloom filter parameters and the user information associated with users identified by the user data analysis circuitry 708 to be included in the array. In some examples, the users to be included in the Bloom filter array are identified based on whether the users were exposed to media being tracked by the AME 102. An example process to generate a Bloom filter array in accordance with teachings disclosed herein is detailed below in connection with FIG. 9.

The example noise generation circuitry 712 adds noise to the Bloom filter arrays generated by the Bloom filter array generation circuitry 710 (e.g., as described above in connection with FIG. 2).

While an example manner of implementing the database proprietor apparatus 700 of FIG. 1 is illustrated in FIG. 7, one or more of the elements, processes, and/or devices illustrated in FIG. 7 may be combined, divided, re-arranged, omitted, eliminated, and/or implemented in any other way. Further, the example user database 702, the example communications interface circuitry 704, the example Bloom filter parameter database 706, the example user data analysis circuitry 708, the example Bloom filter array generation circuitry 710, the example noise generation circuitry 712, and/or, more generally, the example database proprietor apparatus 700 of FIG. 1, may be implemented by hardware, software, firmware, and/or any combination of hardware, software, and/or firmware. Thus, for example, any of the example user database 702, the example communications interface circuitry 704, the example Bloom filter parameter database 706, the example user data analysis circuitry 708, the example Bloom filter array generation circuitry 710, the example noise generation circuitry 712, and/or, more generally, the example database proprietor apparatus 700, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example user database 702, the example communications interface circuitry 704, the example Bloom filter parameter database 706, the example user data analysis circuitry 708, the example Bloom filter array generation circuitry 710, and/or the example noise generation circuitry 712 is/are hereby expressly defined to include a non-transitory computer readable storage device or storage disk such as a memory, a digital versatile disk (DVD), a compact disk (CD), a Blu-ray disk, etc., including the software and/or firmware. Further still, the example database proprietor apparatus 700 of FIG. 1 may include one or more elements, processes, and/or devices in addition to, or instead of, those illustrated in FIG. 7, and/or may include more than one of any or all of the illustrated elements, processes and devices.

Figure 8:
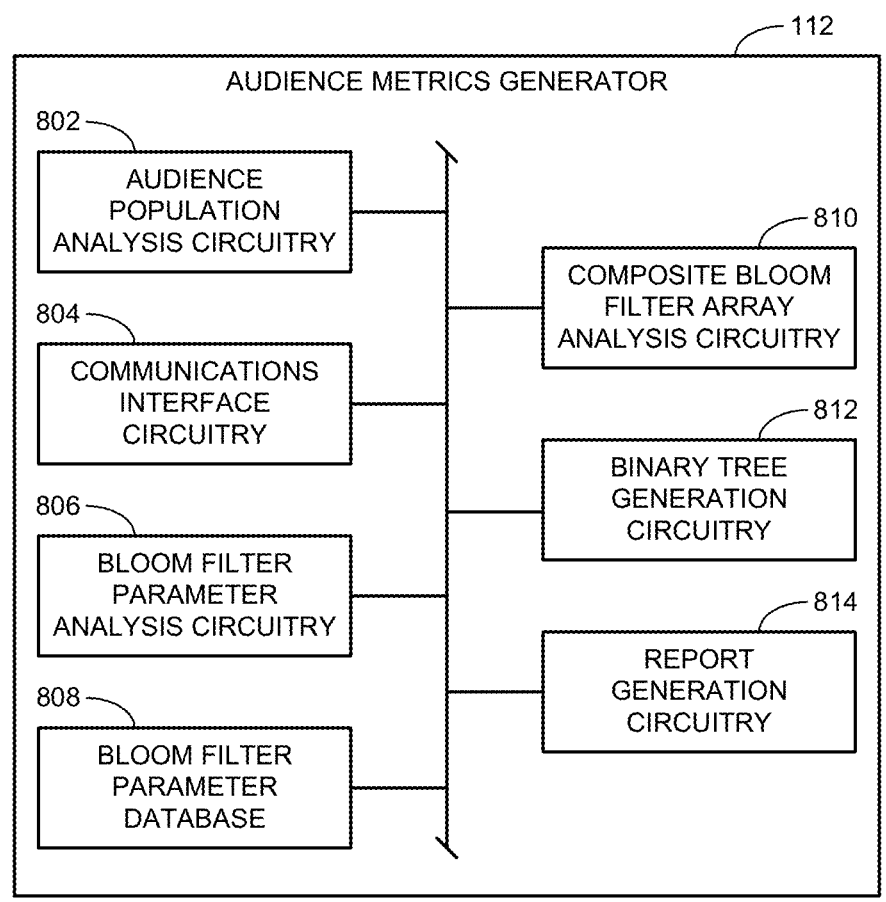
FIG. 8 is a block diagram of an example audience metrics generator of the audience measurement entity of FIG. 1.

FIG. 8 is a block diagram of an example implementation of the example audience metrics generator 112 of the AME 102 of FIG. 1. The example audience metrics generator 112 includes an example audience population analysis circuitry 802, an example communications interface circuitry 804, an example Bloom filter parameter analysis circuitry 806, an example Bloom filter parameter database 808, an example composite Bloom filter array analysis circuitry 810, an example binary tree generation circuitry 812, and an example report generation circuitry 814.

The example audience population analysis circuitry 802 determines a universe estimate for the size of population that may potentially be reached by a particular media based on the geographic region where the media is distributed, the platforms through which the media is distributed, and/or any other suitable factor(s). The example communications interface circuitry 804 enables the audience metrics generator 112 to communicate with the database proprietors 106a-b.

The example Bloom filter parameter analysis circuitry 806 determines suitable parameters for Bloom filter arrays based on the universe estimate of the audience population analysis circuitry 802. More particularly, in some examples, the Bloom filter parameter analysis circuitry 806 determines parameters defining the hash function(s) used to evaluate PII data associated with particular users to be represented in the Bloom filter array and how outputs of the hash functions map to particular bits or elements of the array. Further, in some examples, the Bloom filter parameter analysis circuitry 806 determines a suitable length for the Bloom filter array based on a universe estimate and/or a desired saturation level for the filter. In some examples, the parameters defining the hash function(s) and length of the Bloom filter array are stored in the Bloom filter parameter database 808 along with other Bloom filter parameters (e.g., noise parameters). Further, in some examples, the Bloom filter parameters stored in the database 808 may be provided to the database proprietors 106*a-b* via the example communications interface circuitry 804. In some examples, the noise parameters (and/or other Bloom filter parameters) may be provided by the database proprietors 106*a-b* and received via the communications interface circuitry 804.

The example composite Bloom filter array analysis circuitry 810 generates a composite Bloom filter array corresponding to the union of a pair of Bloom filter arrays. Further, in some examples, the composite Bloom filter array analysis circuitry 810 estimates a cardinality of the composite Bloom filter array, which corresponds to an estimate of the cardinality of the union of the corresponding pair of Bloom filter arrays. In some examples, at least one of the pair of Bloom filter arrays may be an original public Bloom filter array received from one of the database proprietors 106*a-b*. In some examples, at least one of the pair of Bloom filter arrays may be a composite Bloom filter array generated by the composite Bloom filter array analysis circuitry 810 from a previously analyzed pair of Bloom filter arrays. The previously analyzed Bloom filter arrays may correspond to previously generated composite Bloom filter arrays or to original Bloom filter arrays provided by the database proprietors 106*a-b*. Regardless of whether the pair of Bloom filter arrays analyzed by the composite Bloom filter array analysis circuitry 810 corresponds to original Bloom filter arrays or composite Bloom filter arrays, the cardinality of the union of the pair of Bloom filters is estimated following the process outlined above in connection with Equations 11 and 12.

To estimate the cardinality of the union of two Bloom filter arrays as outlined above depends on the probabilities included in the noise probability arrays associated with the Bloom filter arrays. As described above, the noise probability arrays for original Bloom filter arrays are provided by the database proprietors 106*a-b*. However, no noise probability arrays are provided for composite Bloom filter arrays because they are based on the combining of two other Bloom filter arrays (whether original or composite). Accordingly, in some examples, in addition to generating a composite Bloom filter array from two previous Bloom filter arrays, the composite Bloom filter array analysis circuitry 810 also generates effective noise probability arrays for the newly generated composite Bloom filter array. The effective noise probability arrays are generated to be used in the cardinality estimate of the union of the composite Bloom filter array and one other Bloom filter array (either a different composite array (which will also have associated effective noise probability arrays) or an original array (for which the noise probability arrays will be provided by the database proprietor)). The process for calculating the effective noise probability arrays for a particular composite Bloom filter is described above in connection with Equations 18-23.

In some examples, cardinality estimates are generated on a relatively frequent basis (e.g., once a day). Accordingly, where the Bloom filter arrays may be thousands of bits long and be representative of hundreds of thousands or even millions of users, it is necessary to implement the numerical analysis on a computer because such analysis cannot practically be performed by a human in their mind and/or using pen and paper in so short a time.

The example binary tree generation circuitry 812 generates or defines a binary tree that specifies the order in which different pairs of Bloom filter arrays may be analyzed by the composite Bloom filter array analysis circuitry 810 until a final composite Bloom filter array has been generated that is representative of the union of all original Bloom filter arrays provided by the database proprietors 106*a-b*. That is, while examples disclosed herein involve the analysis of two Bloom filter arrays at a time, the union of any number of Bloom filter arrays may be analyzed by repeatedly analyzing different pairs of original and/or composite Bloom filter arrays until all Bloom filter arrays have been combined into a final composite Bloom filter array. The cardinality estimation for the final composite Bloom filter array corresponds to the cardinality estimation for the union of all the original Bloom filter arrays. In some examples, the ordering of the pairs of Bloom filter arrays to be analyzed is based on a particular (e.g., pre-defined) binary tree. In other examples, the binary tree may be dynamically generated by selecting the two Bloom filter arrays (whether original or composite) that have the lowest overall error in noise (e.g., the least amount of noise) as indicated by the effective noise error calculated for each array to be analyzed as described above in connection with Equations 24 and 25.

The example report generation circuitry 814 generates any suitable report conveying audience measurement information and estimates. In some examples, where the Bloom filter arrays correspond to exposure to an advertisement in an advertising campaign, the report generated by the report generation circuitry 814 includes an indication of reach of the advertising campaign. That is, the report includes an indication of the total number of unique individuals that were exposed to the advertisement during a relevant period of time. In some examples, the total number of unique individuals corresponds to the cardinality estimate for a unioned set of Bloom filter arrays as described above.

In some examples, the examples the audience metrics generator 112 includes means for receiving Bloom filter arrays. For example, the means for receiving may be implemented by communications interface circuitry 804. In some examples, the communications interface circuitry 804 may be implemented by machine executable instructions such as that implemented by at least block 1008 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the communications interface circuitry 804 is implemented by other hardware logic circuitry, hardware implemented state machines, and/or any other combination of hardware, software, and/or firmware. For example, the communications interface circuitry 804 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the examples the audience metrics generator 112 includes means for analyzing Bloom filter arrays. For example, the means for analyzing may be implemented by composite Bloom filter array analysis circuitry 810. In some examples, the composite Bloom filter array analysis circuitry 810 may be implemented by machine executable instructions such as that implemented by at least blocks 1008, 1014, 1016, 1020, 1022, and 1026 of FIG. 10, blocks 1102, 1104, and 1106 of FIG. 11, and blocks 1202, 1204, and 1206 of FIG. 12 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the composite Bloom filter array analysis circuitry 810 is implemented by other hardware logic circuitry, hardware implemented state machines, and/or any other combination of hardware, software, and/or firmware. For example, the composite Bloom filter array analysis circuitry 810 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the examples the audience metrics generator 112 includes means for generating a binary tree. For example, the means for generating may be implemented by binary tree generation circuitry 812. In some examples, the binary tree generation circuitry 812 may be implemented by machine executable instructions such as that implemented by at least blocks 1010, 1012, 1018, and 1024 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the binary tree generation circuitry 812 is implemented by other hardware logic circuitry, hardware implemented state machines, and/or any other combination of hardware, software, and/or firmware. For example, the binary tree generation circuitry 812 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audience metrics generator 112 of FIG. 1 is illustrated in FIG. 8, one or more of the elements, processes, and/or devices illustrated in FIG. 8 may be combined, divided, re-arranged, omitted, eliminated, and/or implemented in any other way. Further, the example audience population analysis circuitry 802, the example communications interface circuitry 804, the example Bloom filter parameter analysis circuitry 806, the example Bloom filter parameter database 808, the example composite Bloom filter array analysis circuitry 810, the example binary tree generation circuitry 812, the example report generation circuitry 814, and/or, more generally, the example audience metrics generator 112 of FIG. 1, may be implemented by hardware, software, firmware, and/or any combination of hardware, software, and/or firmware. Thus, for example, any of the example audience population analysis circuitry 802, the example communications interface circuitry 804, the example Bloom filter parameter analysis circuitry 806, the example Bloom filter parameter database 808, the example composite Bloom filter array analysis circuitry 810, the example binary tree generation circuitry 812, the example report generation circuitry 814, and/or, more generally, the example audience metrics generator 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example audience population analysis circuitry 802, the example communications interface circuitry 804, the example Bloom filter parameter analysis circuitry 806, the example Bloom filter parameter database 808, the example composite Bloom filter array analysis circuitry 810, the example binary tree generation circuitry 812, and/or the example report generation circuitry 814 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audience metrics generator 112 of FIG. 1 may include one or more elements, processes, and/or devices in addition to, or instead of, those illustrated in FIG. 8, and/or may include more than one of any or all of the illustrated elements, processes and devices.

Figure 9:
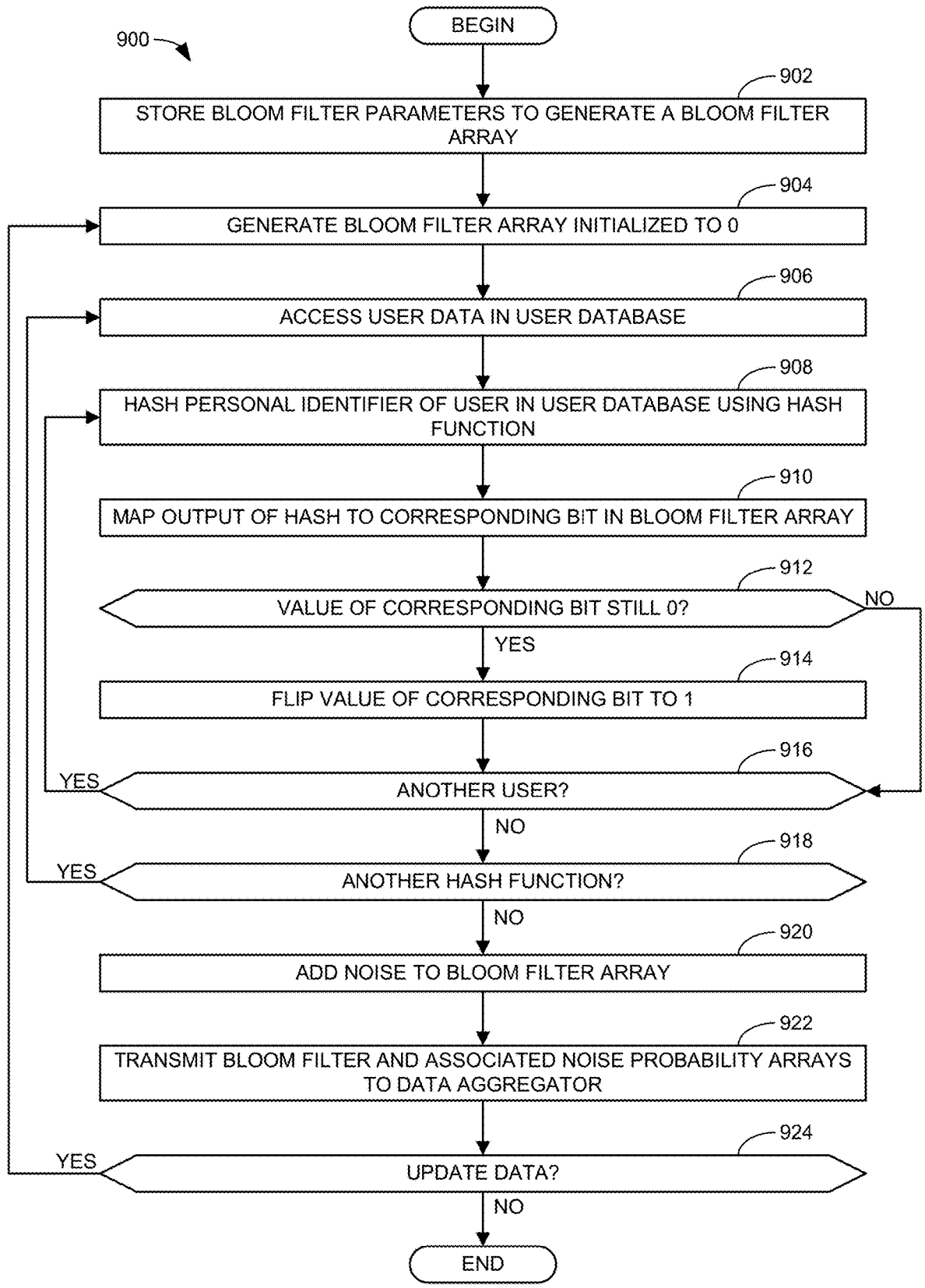
FIG. 9 is a flowchart representative of example machine readable instructions that may be executed and/or instantiated by example processor circuitry to implement the example database proprietor apparatus of FIG. 7.

A flowchart representative of example hardware logic circuitry, machine readable instructions, hardware implemented state machines, and/or any combination thereof for implementing the database proprietor apparatus 700 of FIGS. 1 and/or 7 is shown in FIG. 9. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example database proprietor apparatus 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 10:
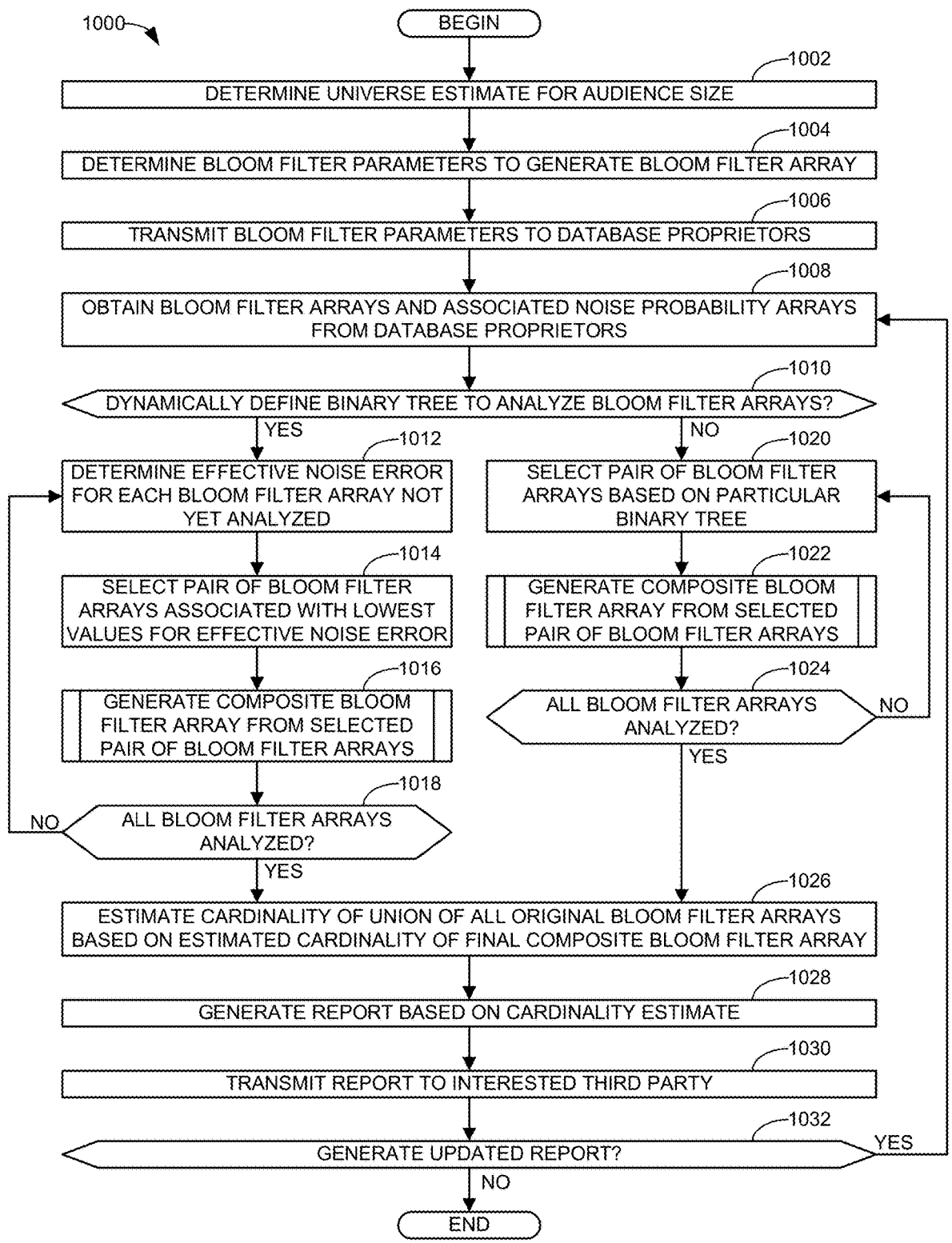
FIGS. 10-12 are flowcharts representative of example machine readable instructions that may be executed and/or instantiated by example processor circuitry to implement the example audience metrics generator of FIG. 8.
Figure 11:
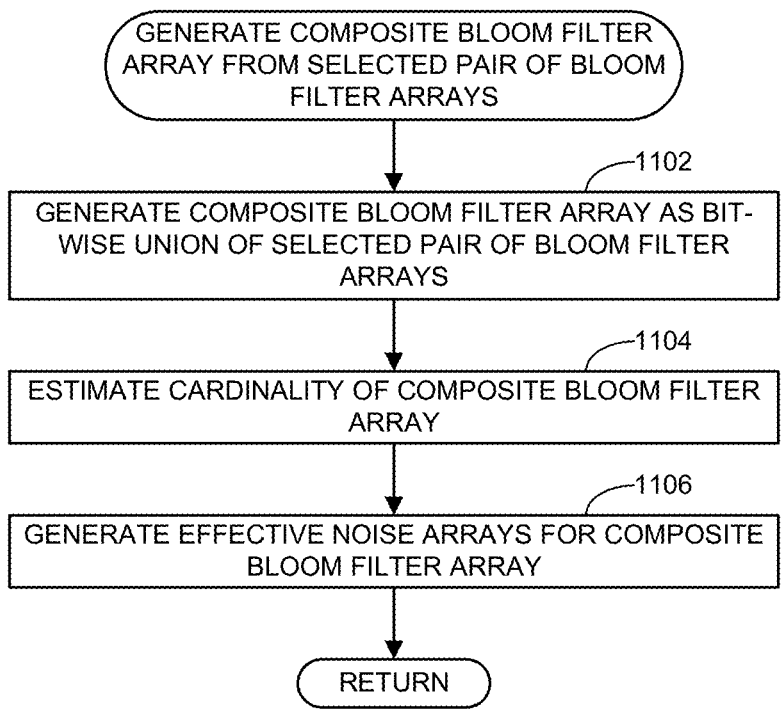
Figure 12:
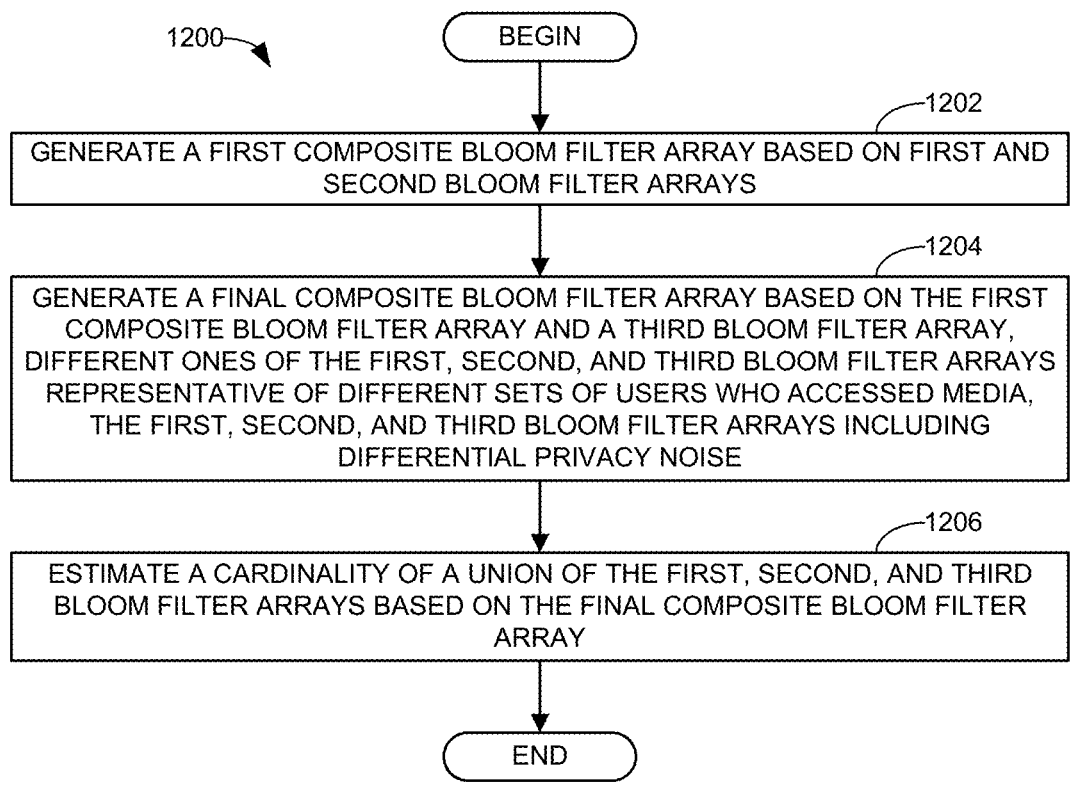

A flowchart representative of example hardware logic circuitry, machine readable instructions, hardware implemented state machines, and/or any combination thereof for implementing the audience metrics generator 112 of FIGS. 1 and/or 8 is shown in FIGS. 10-12. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 10-12, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. [figure nos.] may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to generate a Bloom filter array. In some examples, FIG. 9 is independently implemented by each database proprietor 106a-b (FIG. 1) that is to provide a Bloom filter array to the AME 102 (FIG. 1) in connection with a particular item of media for which exposure metrics are desired. The machine readable instructions and/or operations 900 of FIG. 9 begin at block 902 where the example bloom filter parameter database 706 stores Bloom filter parameters to generate a Bloom filter array. At block 904, the example Bloom filter array generation circuitry 710 generates a Bloom filter array initialized to 0. In some examples, the length of the Bloom filter array is defined by and/or agreed upon between the AME 102 and each database proprietor 106a-b that is to generate a Bloom filter array based on the example process of FIG. 10. At block 906, the example user data analysis circuitry 708 accesses user data in the user database 702. At block 908, the example Bloom filter array generation circuitry 710 hashes a personal identifier in the user database 702 using a hash function defined in the Bloom filter parameters. At block 910, the example Bloom filter array generation circuitry 710 maps an output of the hash to a corresponding bit in the Bloom filter array. At block 912, the example Bloom filter array generation circuitry 710 determines whether the value of the corresponding bit is still 0. If so, control advances to block 914 where the example Bloom filter array generation circuitry 710 flips the value of the corresponding bit to 1. Thereafter, control advances to block 916. Returning to block 912, if the value of the corresponding bit has already been flipped to 1, control advances directly to block 916.

At block 916, the example Bloom filter array generation circuitry 710 determines whether there is another user. If so, control returns to block 908. If not, control advances to block 918 where the example Bloom filter array generation circuitry 710 determines whether there is another hash function. If so, control returns to block 906. Otherwise, control advances to block 920 where the example noise generation circuitry 712 adds noise to the Bloom filter. In some examples, the noise generation circuitry 712 may randomly flip bits having a value of 0 to 1 with a probability of p and also flip bits having a value of 1 to 0 with a probability of 1−q. In some examples, the particular value of p and q used for each bit in the Bloom filter array may be defined by respective noise probability arrays. At block 922, the example communications interface circuitry 704 transmits the Bloom filter array and the associated noise probability arrays to a data aggregator (e.g., the AME 102). At block 924, the example Bloom filter array generation circuitry 710 determines whether to update the data. In some examples, data is updated on a relatively frequent basis (e.g., once a week, once a day, etc.). If the data is to be updated, control returns to block 904 to repeat the process. Otherwise, the example process of FIG. 9 ends.

FIG. 10 is a flowchart representative of example machine readable instructions and/or example operations 1000 that may be executed and/or instantiated by processor circuitry to estimate the cardinality of the union of multiple Bloom filter arrays. The machine readable instructions and/or operations 1000 of FIG. 10 begin at block 1002 where the example audience population analysis circuitry 802 determines a universe estimate for an audience size. At block 1004, the example Bloom filter parameter analysis circuitry 806 determines Bloom filter parameters to generate a Bloom filter array. In some examples, the Bloom filter parameters include a specified length for the Bloom filter arrays, which is defined based on the universe estimate. At block 1006, the example communications interface circuitry 804 transmits the sketch data parameter(s) to the database proprietors 106a-b. At block 1008, the example composite Bloom filter array analysis circuitry 810 obtains Bloom filter arrays and associated noise probability arrays from the database proprietors 106a-b. In some examples, the Bloom filter arrays, and the associated noise probability arrays are received via the communications interface circuitry 804 in connection with the transmission of block 922 of FIG. 9.

At block 1010, the example binary tree generation circuitry 812 determines whether to dynamically define a binary tree to analyze the Bloom filter arrays. If so, control advances to block 1012, where the example binary tree generation circuitry 812 determines an effective noise error for each Bloom filter array not yet analyzed. In this examples, the Bloom filter arrays to be analyzed include original Bloom filter arrays provided by the database proprietors 106a-b as well as composite Bloom filter arrays. However, the Bloom filter arrays "not yet analyzed" excludes the Bloom filter arrays that already served as the basis for a previously generated composite Bloom filter array. At block 1014, the example composite Bloom filter array analysis circuitry 810 selects the pair of Bloom filter arrays associated with the lowest values for the effective noise error.

At block 1016, the example composite Bloom filter array analysis circuitry 810 generates a composite Bloom filter array from the selected pair of Bloom filter arrays. Further, detail regarding the implementation of block 1016 is provided in connection with the flowchart shown in FIG. 11. In particular, the example process of FIG. 11 begins at block 1102 where the example composite Bloom filter array analysis circuitry 810 generates a composite Bloom filter array as a bit-wise union of the selected pair of Bloom filter arrays. At block 1104, the example composite Bloom filter array analysis circuitry 810 estimates a cardinality of the composite Bloom filter array. At block 1106, the example composite Bloom filter array analysis circuitry 810 generates effective noise arrays for the composite Bloom filter array. Thereafter, the example process of FIG. 11 ends and returns to complete the process of FIG. 10.

Returning to FIG. 10, at block 1018, the example binary tree generation circuitry 812 determines whether all Bloom filter arrays have been analyzed. If not, control returns to block 1012 to continue the process. Otherwise, control advances to block 1026. Returning to block 1010, if the example binary tree generation circuitry 812 determines not to dynamically define a binary tree to analyze the Bloom filter arrays, control advances to block 1020. At block 1020, the example composite Bloom filter array analysis circuitry 810 selects a pair of Bloom filter arrays based on a particular (e.g., user defined) binary tree. Thereafter, at block 1022, the example composite Bloom filter array analysis circuitry 810 generates a composite Bloom filter array for the selected pair of Bloom filter arrays. Block 1022 follows the same process as block 1016, which is described in connection with the flowchart of FIG. 11 as outlined above. At block 1024, the example binary tree generation circuitry 812 determines whether all Bloom filter arrays have been analyzed. If not, control returns to block 1020 to continue the process. Otherwise, control advances to block 1026.

At block 1026, the example composite Bloom filter array analysis circuitry 810 estimates the cardinality of the union of all original Bloom filter arrays based on the estimated cardinality of the final composite Bloom filter (estimated at block 1104 of FIG. 11). At block 1028, the example report generation circuitry 814 generates a report based on the cardinality estimate. At block 1030, the example communications interface circuitry 804 transmits the report to an interested third party. At block 1032, the example report generation circuitry 814 determines whether to generate an updated report. As mentioned above, in some examples, reports are generated on a relatively frequent basis (e.g., weekly, daily, etc.). If an updated report is to be generated, control returns to block 1008. Otherwise, the example program of FIG. 10 ends.

FIG. 12 is a flowchart representative of example machine readable instructions and/or example operations 1200 that may be executed and/or instantiated by processor circuitry to estimate the cardinality of the union of multiple Bloom filter arrays. The machine readable instructions and/or operations 1200 of FIG. 12 begin at block 1202 where the example composite Bloom filter array analysis circuitry 810 generates a first composite Bloom filter array based on first and second Bloom filter arrays. At block 1204, the example composite Bloom filter array analysis circuitry 810 generates a final composite Bloom filter array based on the first composite Bloom filter array and a third Bloom filter array, different ones of the first, second, and third Bloom filter arrays representative of different sets of users who accessed media, the first, second, and third Bloom filter arrays including differential privacy noise. At block 1204, the example composite Bloom filter array analysis circuitry 810 estimates a cardinality of a union of the first, second, and third Bloom filter arrays based on the final composite Bloom filter array. Thereafter, the example process of FIG. 12 ends.

Figure 13:
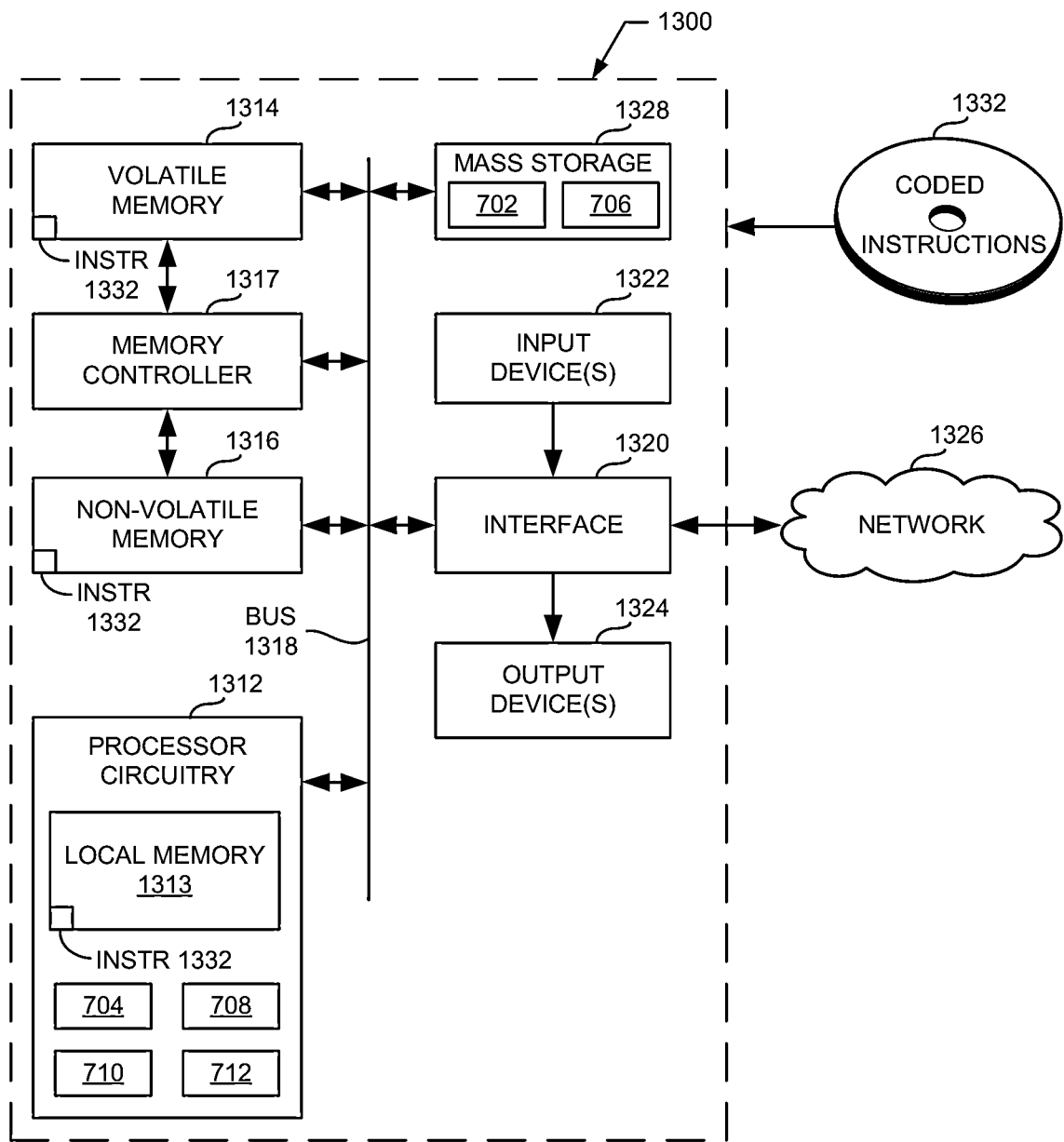
FIG. 13 is a block diagram of an example processing platform including processor circuitry structured to execute and/or instantiate the example machine readable instructions of FIG. 9 to implement the example database proprietor apparatus of FIG. 7.

FIG. 13 is a block diagram of an example processor platform 1300 structured to execute and/or instantiate the machine readable instructions and/or operations of FIG. 9 to implement the database proprietor apparatus 700 of FIGS. 1 and/or 7. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example communications interface circuitry 704, the example user data analysis circuitry 708, the example Bloom filter array generation circuitry 710, and the example noise generation circuitry 712.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIG. 9, may be stored in the mass storage device 1328, in the volatile memory 1314, in the non-volatile memory 1316, and/or on a removable non-transitory computer readable storage medium such as a CD or DVD.

Figure 14:
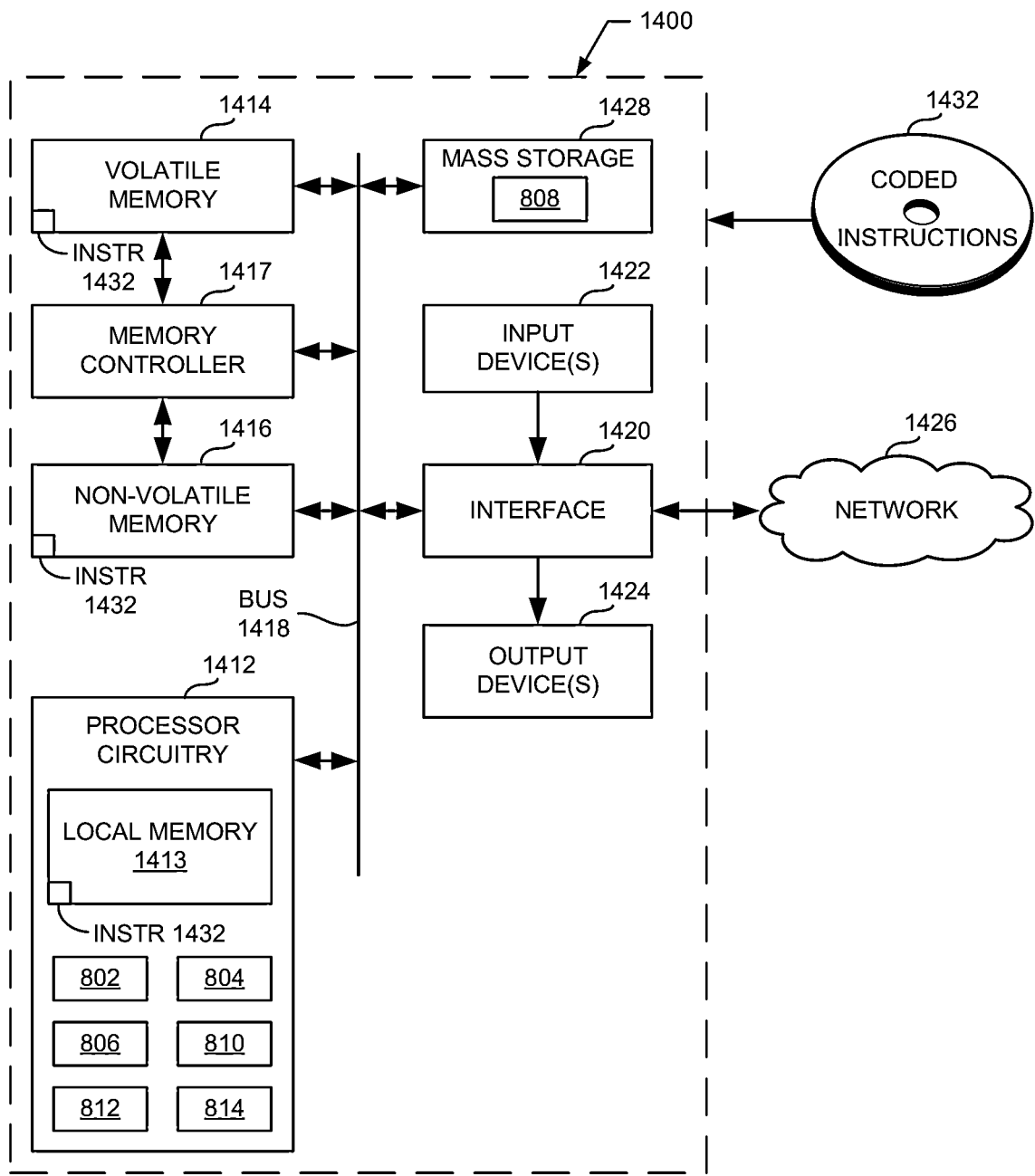
FIG. 14 is a block diagram of an example processing platform including processor circuitry structured to execute and/or instantiate the example machine readable instructions of FIGS. 10, 11, and/or 12 to implement the example audience metrics generator of FIG. 8.

FIG. 14 is a block diagram of an example processor platform 1400 structured to execute and/or instantiate the machine readable instructions and/or operations of FIGS. 10, 11, and/or 12 to implement the audience metrics generator 112 of FIGS. 1 and/or 8. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example audience population analysis circuitry 802, the example communications interface circuitry 804, the example Bloom filter parameter analysis circuitry 806, the example composite Bloom filter array analysis circuitry 810, the example binary tree generation circuitry 812, and the example report generation circuitry 814.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 10-12, may be stored in the mass storage device 1428, in the volatile memory 1414, in the non-volatile memory 1416, and/or on a removable non-transitory computer readable storage medium such as a CD or DVD.

Figure 15:
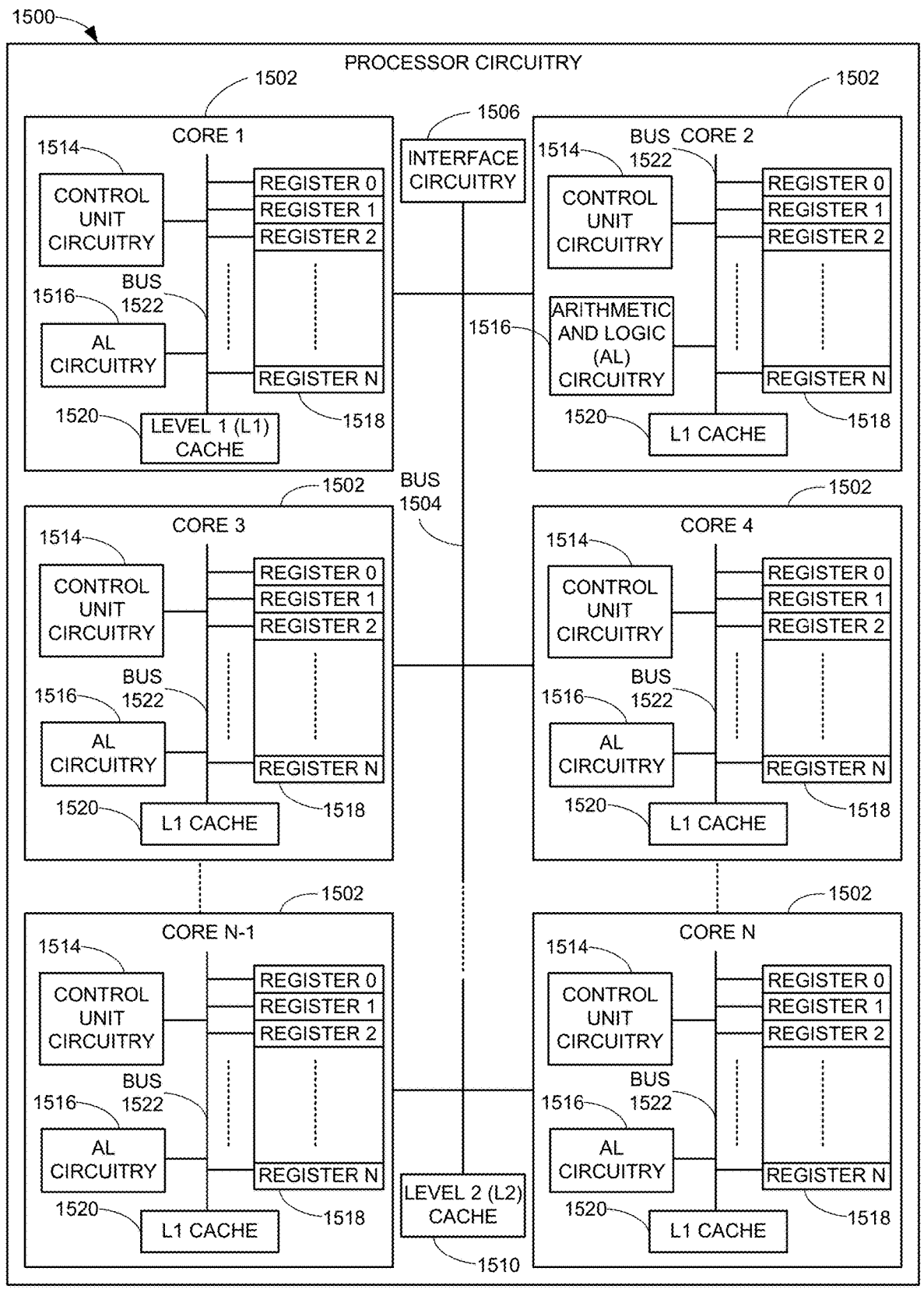
FIG. 15 is a block diagram of an example implementation of the processor circuitry of FIGS. 13 and/or 14.

FIG. 15 is a block diagram of an example implementation of the processor circuitry 1312 of FIG. 13 or the processor circuitry 1412 of FIG. 14. In this example, the processor circuitry 1312 of FIG. 13 or the processor circuitry 1412 of FIG. 14 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowchart of FIG. 9 executed and/or instantiated by processor circuitry 1312 of FIG. 13. Alternatively, the software program may correspond to a portion or all of the machine readable instructions and/or operations represented by the flowcharts of FIGS. 10-12 executed and/or instantiated by processor circuitry 1412 of FIG. 14.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2) cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1314, 1316 of FIG. 13 or the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
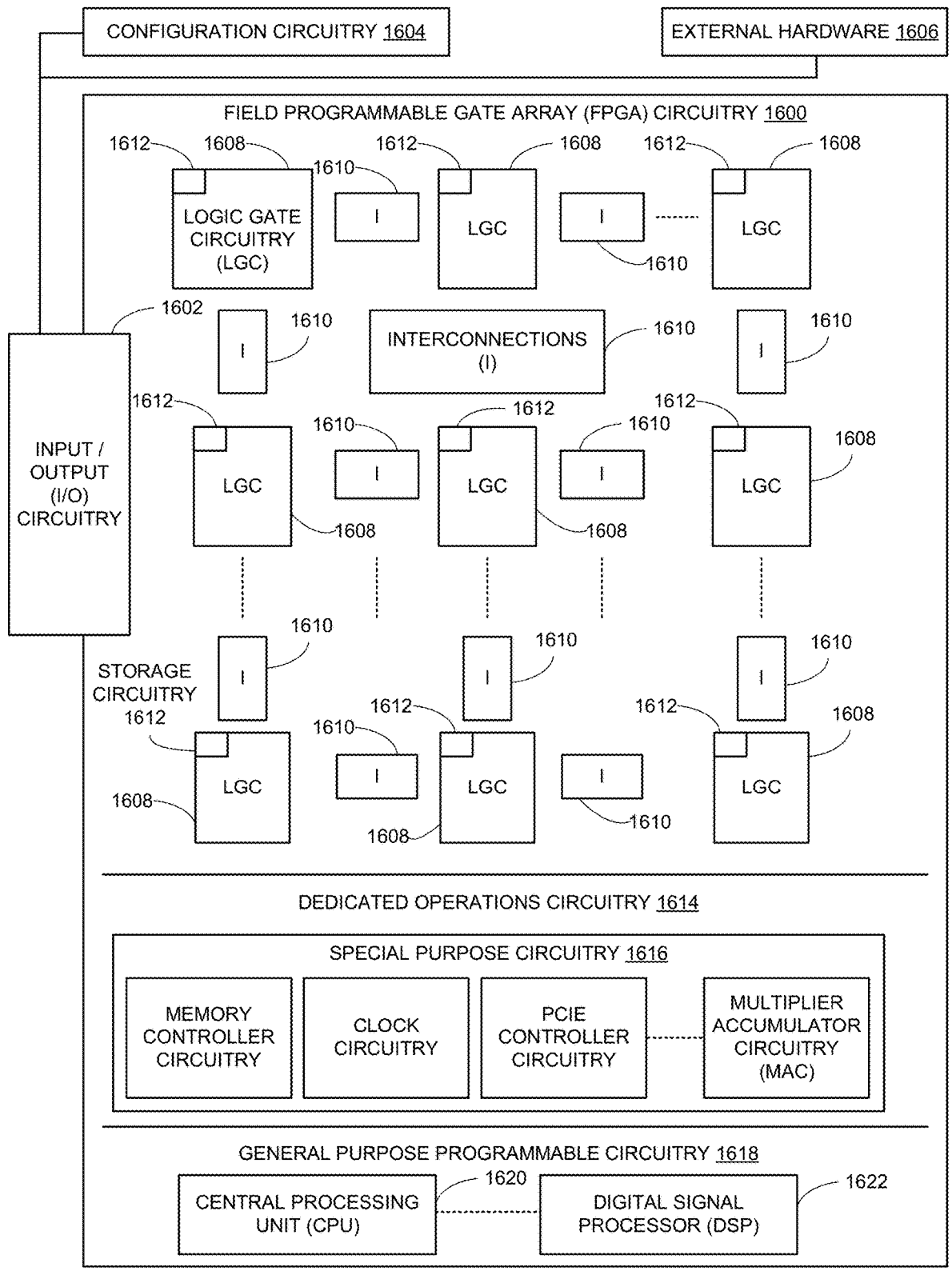
FIG. 16 is a block diagram of another example implementation of the processor circuitry of FIGS. 13 and/or 14.

FIG. 16 is a block diagram of another example implementation of the processor circuitry 1312 of FIG. 13 or the processor circuitry 1412 of FIG. 14. In this example, the processor circuitry 1312, 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 9, 10, and/or 11 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 9, 10, and/or 11. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 9, 10, and/or 11. As such, the FPGA circuitry 1600 may be structured to effectively instantiate some or all of the machine readable instructions of the flowcharts of FIGS. 9, 10, and/or 11 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 9, 10, and/or 11 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 9, 10, and/or 11 and/or other desired operations. The logic gate circuitry 1508 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1312 of FIG. 13 and/or the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1312 of FIG. 13 and/or the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 9, 10, and/or 11 may be executed by one or more of the cores 1502 of FIG. 15 and a second portion of the machine readable instructions represented by the flowcharts of FIGS. 9, 10, and/or 11 may be executed by the FPGA circuitry 1600 of FIG. 16.

In some examples, the processor circuitry 1312 of FIG. 13 and/or the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1312 of FIG. 13 and/or the processor circuitry 1412 of FIG. 14, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that enable the estimation of the cardinality of any number of unioned Bloom filter arrays by analyzing separate pairs of the Bloom filter arrays to generate a corresponding composite Bloom filter array that may be further analyzed following a binary tree until a final composite Bloom filter array is generated. Bloom filter arrays are a type of sketch data that arises in the context of privacy concerns in an online world generated from walled garden (closed platform) data. Thus, examples disclosed herein provide the practical benefit of enabling database proprietors to share summary statistics (e.g., Bloom filter arrays) that are differentially private while still being able to reliably estimate the cardinality of such Bloom filter arrays. This is particularly advantageous in the technical field of audience measurement of online media where some database proprietors are no longer supporting third-party cookies such that audience measurement entities can no longer track exposure to media directly, but must rely on reports from the database proprietors in the form of sketch data (such as Bloom filter arrays as disclosed herein) that preserves the privacy of their users.

Example 1 includes an apparatus comprising at least one memory, instructions in the apparatus, and processor circuitry to execute and/or instantiate the instructions to generate a first composite Bloom filter array based on first and second Bloom filter arrays, generate a final composite Bloom filter array based on the first composite Bloom filter array and a third Bloom filter array, different ones of the first, second, and third Bloom filter arrays representative of different sets of users who accessed media, the first, second, and third Bloom filter arrays including differential privacy noise, and estimate a cardinality of a union of the first, second, and third Bloom filter arrays based on the final composite Bloom filter array.

Example 2 includes the apparatus of example 1, wherein the processor circuitry is to generate the first composite Bloom filter array based on a bit-wise union of the first and second Bloom filter arrays, and generate the final composite Bloom filter array based on a bit-wise union of the first composite Bloom filter array and the third Bloom filter array.

Example 3 includes the apparatus of example 1, wherein the processor circuitry is to generate noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 4 includes the apparatus of example 3, wherein the processor circuitry is to generate the noise arrays based on first and second pairs of noise probability arrays associated with respective ones of the first and second Bloom filter arrays.

Example 5 includes the apparatus of example 4, wherein the first and second Bloom filter arrays and respective ones of the first and second pairs of noise probability arrays are provided by respective first and second database proprietors, different ones of the different sets of users corresponding to ones of the users who registered with respective ones of the first and second database proprietors.

Example 6 includes the apparatus of example 4, wherein the first pair of noise probability arrays include first values, and the second pair of noise probability arrays include second values, the first values different than the second values.

Example 7 includes the apparatus of example 1, wherein the processor circuitry is to generate a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, and generate the different ones of the composite Bloom filter arrays according to a topology of the binary tree.

Example 8 includes the apparatus of example 7, wherein the processor circuitry is to dynamically construct the topology of the binary tree for successive ones of the composite Bloom filter arrays to be generated based on previously generated ones of the composite Bloom filter arrays.

Example 9 includes the apparatus of example 8, wherein the processor circuitry is to determine effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, and identify a pair of the available Bloom filter arrays to combine for a next one of the successive ones of the composite Bloom filter arrays based on the effective noise errors.

Example 10 includes an apparatus comprising at least one memory, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the interconnections to perform one or more second operations corresponding to the instructions, the storage circuitry to store a result of the one or more second operations, or Application Specific Integrate Circuitry (ASIC) including logic gate circuitry to perform one or more third operations corresponding to the instructions, the processor circuitry to perform at least one of the first operations, the second operations or the third operations to instantiate composite bloom filter array analysis circuitry to generate a first composite Bloom filter array based on first and second Bloom filter arrays, generate a final composite Bloom filter array based on the first composite Bloom filter array and a third Bloom filter array, different ones of the first, second, and third Bloom filter arrays representative of different sets of users who accessed media, the first, second, and third Bloom filter arrays including differential privacy noise, and estimate a cardinality of a union of the first, second, and third Bloom filter arrays based on the final composite Bloom filter array.

Example 11 includes the apparatus of example 10, wherein the composite bloom filter array analysis circuitry is to generate the first composite Bloom filter array based on a bit-wise union of the first and second Bloom filter arrays, and generate the final composite Bloom filter array based on a bit-wise union of the first composite Bloom filter array and the third Bloom filter array.

Example 12 includes the apparatus of example 10, wherein the composite bloom filter array analysis circuitry is to generate noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 13 includes the apparatus of example 12, wherein the composite bloom filter array analysis circuitry is to generate the noise arrays based on first and second pairs of noise probability arrays associated with respective ones of the first and second Bloom filter arrays.

Example 14 includes the apparatus of example 13, wherein the first and second Bloom filter arrays and respective ones of the first and second pairs of noise probability arrays are provided by respective first and second database proprietors, different ones of the different sets of users corresponding to ones of the users who registered with respective ones of the first and second database proprietors.

Example 15 includes the apparatus of example 13, wherein the first pair of noise probability arrays include first values, and the second pair of noise probability arrays include second values, the first values different than the second values.

Example 16 includes the apparatus of example 10, wherein the processor circuitry to instantiate binary tree generation circuitry to generate a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, the composite bloom filter array analysis circuitry to generate the different ones of the composite Bloom filter arrays according to a topology of the binary tree.

Example 17 includes the apparatus of example 16, wherein the binary tree generation circuitry is to dynamically construct the topology of the binary tree for successive ones of the composite Bloom filter arrays to be generated based on previously generated ones of the composite Bloom filter arrays.

Example 18 includes the apparatus of example 17, wherein the binary tree generation circuitry is to determine effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, the composite bloom filter array analysis circuitry to identify a pair of the available Bloom filter arrays to combine for a next one of the successive ones of the composite Bloom filter arrays based on the effective noise errors.

Example 19 includes At least one non-transitory computer readable storage medium comprising instructions that, when executed, cause processor circuitry to at least generate a first composite Bloom filter array based on first and second Bloom filter arrays, generate a final composite Bloom filter array based on the first composite Bloom filter array and a third Bloom filter array, different ones of the first, second, and third Bloom filter arrays representative of different sets of users who accessed media, the first, second, and third Bloom filter arrays including differential privacy noise, and estimate a cardinality of a union of the first, second, and third Bloom filter arrays based on the final composite Bloom filter array.

Example 20 includes the at least one non-transitory computer readable storage medium of example 19, wherein the instructions cause the processor circuitry to generate the first composite Bloom filter array based on a bit-wise union of the first and second Bloom filter arrays, and generate the final composite Bloom filter array based on a bit-wise union of the first composite Bloom filter array and the third Bloom filter array.

Example 21 includes the at least one non-transitory computer readable storage medium of example 19, wherein the instructions cause the processor circuitry to generate noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 22 includes the at least one non-transitory computer readable storage medium of example 21, wherein the instructions cause the processor circuitry to generate the noise arrays based on first and second pairs of noise probability arrays associated with respective ones of the first and second Bloom filter arrays.

Example 23 includes the at least one non-transitory computer readable storage medium of example 22, wherein the first and second Bloom filter arrays and respective ones of the first and second pairs of noise probability arrays are provided by respective first and second database proprietors, different ones of the different sets of users corresponding to ones of the users who registered with respective ones of the first and second database proprietors.

Example 24 includes the at least one non-transitory computer readable storage medium of example 22, wherein the first pair of noise probability arrays include first values, and the second pair of noise probability arrays include second values, the first values different than the second values.

Example 25 includes the at least one non-transitory computer readable storage medium of example 19, wherein the instructions cause the processor circuitry to generate a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, and generate the different ones of the composite Bloom filter arrays according to a topology of the binary tree.

Example 26 includes the at least one non-transitory computer readable storage medium of example 25, wherein the instructions cause the processor circuitry to dynamically construct the topology of the binary tree for successive ones of the composite Bloom filter arrays to be generated based on previously generated ones of the composite Bloom filter arrays.

Example 27 includes the at least one non-transitory computer readable storage medium of example 26, wherein the instructions cause the processor circuitry to determine effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, and identify a pair of the available Bloom filter arrays to combine for a next one of the successive ones of the composite Bloom filter arrays based on the effective noise errors.

Example 28 includes an apparatus comprising means for receiving first, second, and third Bloom filter arrays from respective first, second, and third database proprietors, different ones of the first, second, and third Bloom filter arrays representative of different sets of users who accessed media, the first, second, and third Bloom filter arrays including differential privacy noise, and means for analyzing bloom filter arrays, the analyzing means to generate a first composite Bloom filter array based on the first and second Bloom filter arrays, generate a final composite Bloom filter array based on the first composite Bloom filter array and the third Bloom filter array, and estimate a cardinality of a union of the first, second, and third Bloom filter arrays based on the final composite Bloom filter array.

Example 29 includes the apparatus of example 28, wherein the analyzing means is to generate the first composite Bloom filter array based on a bit-wise union of the first and second Bloom filter arrays, and generate the final composite Bloom filter array based on a bit-wise union of the first composite Bloom filter array and the third Bloom filter array.

Example 30 includes the apparatus of example 28, wherein the analyzing means is to generate noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 31 includes the apparatus of example 30, wherein the analyzing means is to generate the noise arrays based on first and second pairs of noise probability arrays associated with respective ones of the first and second Bloom filter arrays.

Example 32 includes the apparatus of example 31, wherein the first and second pairs of noise probability arrays are provided by respective ones of the first and second database proprietors, different ones of the different sets of users corresponding to ones of the users who registered with respective ones of the first and second database proprietors.

Example 33 includes the apparatus of example 31, wherein the first pair of noise probability arrays include first values, and the second pair of noise probability arrays include second values, the first values different than the second values.

Example 34 includes the apparatus of example 28, further including means for generating a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, the analyzing means to generate the different ones of the composite Bloom filter arrays based on a topology of the binary tree.

Example 35 includes the apparatus of example 34, wherein the binary tree generating means is to dynamically construct the topology of the binary tree for successive ones of the composite Bloom filter arrays to be generated based on previously generated ones of the composite Bloom filter arrays.

Example 36 includes the apparatus of example 35, wherein the binary tree generating means is to determine effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, the analyzing means to identify a pair of the available Bloom filter arrays to combine for a next one of the successive ones of the composite Bloom filter arrays based on the effective noise errors.

Example 37 includes an apparatus comprising communications interface circuitry to receive first, second, and third Bloom filter arrays from respective first, second, and third database proprietors, different ones of the first, second, and third Bloom filter arrays representative of different sets of users who accessed media, the first, second, and third Bloom filter arrays including differential privacy noise, and composite bloom filter array analysis circuitry to generate a first composite Bloom filter array based on the first and second Bloom filter arrays, generate a final composite Bloom filter array based on the first composite Bloom filter array and the third Bloom filter array, and estimate a cardinality of a union of the first, second, and third Bloom filter arrays based on the final composite Bloom filter array.

Example 38 includes the apparatus of example 37, wherein the composite bloom filter array analysis circuitry is to generate the first composite Bloom filter array based on a bit-wise union of the first and second Bloom filter arrays, and generate the final composite Bloom filter array based on a bit-wise union of the first composite Bloom filter array and the third Bloom filter array.

Example 39 includes the apparatus of example 37, wherein the composite bloom filter array analysis circuitry is to generate noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 40 includes the apparatus of example 39, wherein the composite bloom filter array analysis circuitry is to generate the noise arrays based on first and second pairs of noise probability arrays associated with respective ones of the first and second Bloom filter arrays.

Example 41 includes the apparatus of example 40, wherein the first and second pairs of noise probability arrays are provided by respective ones of the first and second database proprietors, different ones of the different sets of users corresponding to ones of the users who registered with respective ones of the first and second database proprietors.

Example 42 includes the apparatus of example 40, wherein the first pair of noise probability arrays include first values, and the second pair of noise probability arrays include second values, the first values different than the second values.

Example 43 includes the apparatus of example 37, further including binary tree generation circuitry to generate a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, the composite bloom filter array analysis circuitry to generate the different ones of the composite Bloom filter arrays according to a topology of the binary tree.

Example 44 includes the apparatus of example 43, wherein the binary tree generation circuitry is to dynamically construct the topology of the binary tree for successive ones of the composite Bloom filter arrays to be generated based on previously generated ones of the composite Bloom filter arrays.

Example 45 includes the apparatus of example 44, wherein the binary tree generation circuitry is to determine effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, the composite bloom filter array analysis circuitry to identify a pair of the available Bloom filter arrays to combine for a next one of the successive ones of the composite Bloom filter arrays based on the effective noise errors.

Example 46 includes a method comprising generating, by executing an instruction with at least one processor, a first composite Bloom filter array based on first and second Bloom filter arrays, generating, by executing an instruction with the at least one processor, a final composite Bloom filter array based on the first composite Bloom filter array and a third Bloom filter array, different ones of the first, second, and third Bloom filter arrays representative of different sets of users who accessed media, the first, second, and third Bloom filter arrays including differential privacy noise, and estimating a cardinality of a union of the first, second, and third Bloom filter arrays based on the final composite Bloom filter array.

Example 47 includes the method of example 46, wherein the generating of the first composite Bloom filter array includes generating a bit-wise union of the first and second Bloom filter arrays, and the generating of the final composite Bloom filter array includes generating a bit-wise union of the first composite Bloom filter array and the third Bloom filter array.

Example 48 includes the method of example 46, further including generating noise arrays for the first composite Bloom filter array, the noise arrays defining probabilities for bit-flipping values in individual elements of a latent Bloom filter array that would result in the first composite Bloom filter array, the latent Bloom filter array corresponding to a bit-wise union of the first and second Bloom filter arrays prior to addition of the differential privacy noise.

Example 49 includes the method of example 48, wherein the generating of the noise arrays is based on first and second pairs of noise probability arrays associated with respective ones of the first and second Bloom filter arrays.

Example 50 includes the method of example 49, wherein the first and second Bloom filter arrays and respective ones of the first and second pairs of noise probability arrays are provided by respective first and second database proprietors, different ones of the different sets of users corresponding to ones of the users who registered with respective ones of the first and second database proprietors.

Example 51 includes the method of example 49, wherein the first pair of noise probability arrays include first values, and the second pair of noise probability arrays include second values, the first values different than the second values.

Example 52 includes the method of example 46, further including generating a binary tree having leaf nodes and non-leaf nodes, different ones of the leaf nodes to be associated with different ones of public Bloom filter arrays provided by corresponding database proprietors, the public Bloom filter arrays including the first, second, and third Bloom filter arrays, different ones of the non-leaf nodes to be associated with different ones of composite Bloom filter arrays, the different ones of the composite Bloom filter arrays including the first composite Bloom filter array and the final composite Bloom filter array, and generating the different ones of the composite Bloom filter arrays according to a topology of the binary tree.

Example 53 includes the method of example 52, wherein the generating of the binary tree includes dynamically constructing the topology of the binary tree for successive ones of the composite Bloom filter arrays to be generated based on previously generated ones of the composite Bloom filter arrays.

Example 54 includes the method of example 53, further including determining effective noise errors for available Bloom filter arrays, the available Bloom filter arrays corresponding to ones of the public Bloom filter arrays and ones of the composite Bloom filter arrays that have not already been combined with other ones of the public Bloom filter arrays and have not already been combined with other ones of the composite Bloom filter arrays, and identifying a pair of the available Bloom filter arrays to combine for a next one of the successive ones of the composite Bloom filter arrays based on the effective noise errors.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A computing system comprising a processor and a memory, the computing system configured to perform a set of acts comprising:
    obtaining a first Bloom filter array generated using first noise arrays, wherein the first Bloom filter array is representative of unique media impressions of a media item logged by a first party;
    obtaining a second Bloom filter array generated using second noise arrays, wherein the second Bloom filter array is representative of unique media impressions of the media item logged by a second party;
    generating an initial composite Bloom filter array based on the first Bloom filter array and the second Bloom filter array;
    estimating effective noise arrays for the initial composite Bloom filter array based on the first noise arrays and the second noise arrays;
    obtaining a third Bloom filter array generated using third noise arrays;

generating a final composite Bloom filter array based on the initial composite Bloom filter array and the third Bloom filter array;

estimating a cardinality of the final composite Bloom filter array based on the effective noise arrays and the third noise arrays; and transmitting, to another computing system, a report conveying information that is derived from the cardinality.

2. The computing system of claim 1, wherein generating the initial composite Bloom filter array comprises determining a bit-wise union of the first Bloom filter array and the second Bloom filter array.

3. The computing system of claim 2, wherein generating the final composite Bloom filter array comprises determining a bit-wise union of the initial composite Bloom filter array and the third Bloom filter array.

4. The computing system of claim 1, wherein:

the first noise arrays define probabilities for bit-flipping values in individual elements of the first Bloom filter array, and the second noise arrays define probabilities for bit-flipping values in individual elements of the second Bloom filter array.

5. The computing system of claim 1, wherein the effective noise arrays define probabilities for bit-flipping values in individual elements of a latent Bloom filter array that would result in the initial composite Bloom filter array, the latent Bloom filter array corresponding to a bit-wise union of a first private array from which the first Bloom filter array is generated and a second private array from which the second Bloom filter array is generated.

6. The computing system of claim 1, wherein the set of acts further comprises obtaining the first noise arrays.

7. A method comprising:

obtaining, by a computing system, a first Bloom filter array generated using first noise arrays, wherein the first Bloom filter array is representative of unique media impressions of a media item logged by a first party;

obtaining, by the computing system, a second Bloom filter array generated using second noise arrays, wherein the second Bloom filter array is representative of unique media impressions of the media item logged by a second party;

generating, by the computing system, an initial composite Bloom filter array based on the first Bloom filter array and the second Bloom filter array;

estimating, by the computing system, effective noise arrays for the initial composite Bloom filter array based on the first noise arrays and the second noise arrays;

obtaining, by the computing system, a third Bloom filter array generated using third noise arrays;

generating, by the computing system, a final composite Bloom filter array based on the initial composite Bloom filter array and the third Bloom filter array;

estimating, by the computing system, a cardinality of the final composite Bloom filter array based on the effective noise arrays and the third noise arrays; and transmitting, by the computing system to another computing system, a report conveying information that is derived from the cardinality.

8. The method of claim 7, wherein generating the initial composite Bloom filter array comprises determining a bit-wise union of the first Bloom filter array and the second Bloom filter array.

9. The method of claim 8, wherein generating the final composite Bloom filter array comprises determining a bit-wise union of the initial composite Bloom filter array and the third Bloom filter array.

10. The method of claim 7, wherein:

the first noise arrays define probabilities for bit-flipping values in individual elements of the first Bloom filter array, and the second noise arrays define probabilities for bit-flipping values in individual elements of the second Bloom filter array.

11. The method of claim 7, wherein the effective noise arrays define probabilities for bit-flipping values in individual elements of a latent Bloom filter array that would result in the initial composite Bloom filter array, the latent Bloom filter array corresponding to a bit-wise union of a first private array from which the first Bloom filter array is generated and a second private array from which the second Bloom filter array is generated.

12. The method of claim 7, further comprising obtaining the first noise arrays.

13. A non-transitory computer-readable medium having stored therein instructions that when executed by a computing system cause the computing system to perform a set of acts comprising:

obtaining a first Bloom filter array generated using first noise arrays, wherein the first Bloom filter array is representative of unique media impressions of a media item logged by a first party;

obtaining a second Bloom filter array generated using second noise arrays, wherein the second Bloom filter array is representative of unique media impressions of the media item logged by a second party;

generating an initial composite Bloom filter array based on the first Bloom filter array and the second Bloom filter array;

estimating effective noise arrays for the initial composite Bloom filter array based on the first noise arrays and the second noise arrays;

obtaining a third Bloom filter array generated using third noise arrays;

generating a final composite Bloom filter array based on the initial composite Bloom filter array and the third Bloom filter array;

estimating a cardinality of the final composite Bloom filter array based on the effective noise arrays and the third noise arrays; and transmitting, to another computing system, a report conveying information that is derived from the cardinality.

14. The non-transitory computer-readable medium of claim 13, wherein generating the initial composite Bloom filter array comprises determining a bit-wise union of the first Bloom filter array and the second Bloom filter array.

15. The non-transitory computer-readable medium of claim 14, wherein generating the final composite Bloom filter array comprises determining a bit-wise union of the initial composite Bloom filter array and the third Bloom filter array.

16. The non-transitory computer-readable medium of claim 13, wherein:

the first noise arrays define probabilities for bit-flipping values in individual elements of the first Bloom filter array, and the second noise arrays define probabilities for bit-flipping values in individual elements of the second Bloom filter array.

17. The non-transitory computer-readable medium of claim 13, wherein the effective noise arrays define probabilities for bit-flipping values in individual elements of a latent Bloom filter array that would result in the initial composite Bloom filter array, the latent Bloom filter array corresponding to a bit-wise union of a first private array from which the first Bloom filter array is generated and a second private array from which the second Bloom filter array is generated.

* * * * *